(12) United States Patent
Rumynin

(10) Patent No.: US 7,308,471 B2
(45) Date of Patent: Dec. 11, 2007

(54) METHOD AND DEVICE FOR PERFORMING OPERATIONS INVOLVING MULTIPLICATION OF SELECTIVELY PARTITIONED BINARY INPUTS USING BOOTH ENCODING

(75) Inventor: Dmitriy Rumynin, Coventry (GB)

(73) Assignee: Arithmatica Limited, Oxford (GB)

( * ) Notice: Subject to any disclaimer, the term of this patent is extended or adjusted under 35 U.S.C. 154(b) by 629 days.

(21) Appl. No.: 10/774,363

(22) Filed: Feb. 6, 2004

(65) Prior Publication Data

US 2004/0225705 A1 Nov. 11, 2004

Related U.S. Application Data

(60) Provisional application No. 60/458,776, filed on Mar. 28, 2003.

(51) Int. Cl.
 *G06F 7/52* (2006.01)
(52) U.S. Cl. .................................................. 708/628
(58) Field of Classification Search ......... 708/627–628
 See application file for complete search history.

(56) References Cited

U.S. PATENT DOCUMENTS

| | | | |
|---|---|---|---|
| 3,634,658 A | 1/1972 | Brown ................... | 235/92 LG |
| 3,757,098 A | 9/1973 | Wright ..................... | 235/175 |
| 4,399,517 A | 8/1983 | Niehaus et al. ............. | 364/784 |
| 4,463,344 A | 7/1984 | Adler et al. .......... | 340/347 DD |
| 4,596,256 A | 6/1986 | Ascher et al. .............. | 128/710 |
| 4,607,176 A | 8/1986 | Burrows et al. ............ | 307/449 |
| 4,993,421 A | 2/1991 | Thornton ................... | 128/670 |
| 5,095,457 A | 3/1992 | Jeong ........................ | 364/758 |
| 5,175,862 A | 12/1992 | Phelps et al. ............... | 395/800 |
| 5,187,679 A | 2/1993 | Vassiliadis et al. ......... | 364/786 |
| D341,423 S | 11/1993 | Bible ........................ | D24/167 |
| 5,325,320 A | 6/1994 | Chiu .......................... | 364/760 |

(Continued)

FOREIGN PATENT DOCUMENTS

EP 0168650 A2 1/1986

(Continued)

OTHER PUBLICATIONS

Flynn, M , et al., "Advanced Computer Arithmatic Design", *John Wiley & Sons 2001*, (2001),46-59.
"Great Britian Search Report Application No. 0405653.7", *Search Report under Section 17*, 3 pages.

(Continued)

*Primary Examiner*—Tan V. Mai
(74) *Attorney, Agent, or Firm*—Schwegman, Lundberg & Woessner P.A.

(57) ABSTRACT

A digital circuit including a Booth encoder having inputs for receiving a plurality of adjacent bits of a first binary input number, and an encoder control input for allowing selection between multiplication of first and second binary input numbers and multiplication of the pairs of binary numbers smaller than the first or second input number, the encoder being configured to encode the bits of the first binary input number dependent on the encoder control input to generate Booth encoded outputs for use in selection of a partial product, the Booth encoder being for use with a selector having inputs for receiving a plurality of adjacent bits of the second binary input number, and for receiving the Booth encoded outputs from the encoder, the selector being configured to select a partial product bit according to the Booth encoded outputs and the bits of the second binary input number.

42 Claims, 13 Drawing Sheets

U.S. PATENT DOCUMENTS

| | | |
|---|---|---|
| 5,343,417 A | 8/1994 | Flora .......................... 364/758 |
| 5,363,099 A | 11/1994 | Allen .......................... 341/107 |
| 5,475,388 A | 12/1995 | Gormish et al. ............ 341/107 |
| 5,497,342 A | 3/1996 | Mou et al. ................... 364/786 |
| 5,524,082 A | 6/1996 | Horstmann et al. ......... 364/489 |
| D377,983 S | 2/1997 | Sabri et al. ................. D24/167 |
| 5,701,504 A | 12/1997 | Timko |
| 5,712,792 A | 1/1998 | Yamashita et al. .......... 364/489 |
| D407,159 S | 3/1999 | Roberg ...................... D24/167 |
| 5,943,250 A | 8/1999 | Kim et al. ................... 364/757 |
| 5,964,827 A | 10/1999 | Ngo et al. ................... 708/710 |
| 5,995,029 A | 11/1999 | Ryu ........................... 341/101 |
| 6,023,566 A | 2/2000 | Belkhale et al. ........ 395/500.03 |
| 6,035,318 A | 3/2000 | Abdallah et al. ............ 708/628 |
| 6,173,414 B1 | 1/2001 | Zumkehr et al. ............... 714/6 |
| 6,175,852 B1 | 1/2001 | Dhong et al. ............... 708/712 |
| 6,223,198 B1 | 4/2001 | Oberman et al. ........... 708/620 |
| 6,269,386 B1 | 7/2001 | Siers et al. ................. 708/710 |
| 6,353,843 B1 | 3/2002 | Chehrazi et al. ............ 708/631 |
| 6,490,608 B1 | 12/2002 | Zhu ........................... 708/626 |
| 2001/0010051 A1 | 7/2001 | Oberman et al. ........... 708/502 |
| 2002/0026465 A1 | 2/2002 | Rumynin et al. ........... 708/210 |
| 2002/0078110 A1 | 6/2002 | Rumynin et al. ........... 708/210 |
| 2003/0120694 A1 | 6/2003 | Qi .............................. 708/628 |
| 2004/0153490 A1 | 8/2004 | Talwar et al. |
| 2005/0144217 A1* | 6/2005 | Parhi et al. ................. 708/625 |

FOREIGN PATENT DOCUMENTS

| | | |
|---|---|---|
| EP | 0309292 A2 | 3/1989 |
| EP | 0442356 A2 | 8/1991 |
| EP | 0741354 A2 | 11/1996 |
| FR | 2475250 | 8/1981 |
| GB | 2016181 | 9/1979 |
| GB | 2062310 | 5/1981 |
| GB | 2263002 | 7/1993 |
| GB | 2365636 | 2/2002 |
| GB | 2365637 | 2/2002 |
| WO | WO-99/22292 | 5/1999 |
| WO | WO-02/12995 | 2/2002 |

OTHER PUBLICATIONS

Nicholson, J. O., "Parallel-Carry Adders Listing Two-Bit Covers", *IBM Technical Disclosure Bulletin*, 22(11), (Apr. 1980), 5036-5037.

Ong, S., et al., "A Comparison of ALU Structures for VLSI Technology", *Proceedings, 6th Symposium on Computer Arithmetic (IEEE)*, (1983), 10-16.

Schmookler, M. S., et al., "Group-Carry Generator", *IBM Technical Disclosure Bulletin*, 6(1), (Jun. 1963), 77-78.

Weinberger, A., "Extension of the Size of Group Carry Signals", *IBM Technical Disclosure Bulletin*, 22(4), (Sep. 1979), 1548-1550.

Weinberger, A., "Improved Carry-Look-Ahead", *IBM Technical Disclosure Bulletin*, 21(6), (Nov. 1978), 2460-2461.

Bedrij, O. J., "Carry-Select Adder", *IRE Trans.*, EC-11, (Jun. 1962), 340-346.

Booth, Andrew, "A Signed Binary Multiplication Technique", *Oxford University Press*, Reprinted from Q.J. Mech. Appl. Math. 4:236-240, (1951), pp. 100-104.

Chakraborty, S., et al., "Synthesis of Symmetric Functions for Path-Delay Fault Testability", *12th International Conference on VLSI Design*, (1999), pp. 512-517.

Dadda, L., "On Parallel Digital Multipliers", *Associazione Elettrontecnia ed Elettronica Italiana*, Reprinted from Alta Freq. 45:574-580, (1976), pp. 126-132.

Dadda, L., "Some Schemes For Parallel Multipliers", *Assocciazione Elettrotenica ed Elettronica Italiana*, Reprinted from Alta Freq. 34:349-356, (1965), pp. 118-125.

De Micheli, G., et al., "Optimal State Assignment for Finite State Machines", *IEEE Transactions on Computer-Aided Design*, vol. CAD-4 (3), (Jul. 1985), pp. 269-285.

Debnath, D., "Minimization of and-or-exor Three-Level Networks with AND Gate Sharing", *IEICE Trans. Inf. & Syst.*, E80-D, 10, (1997), pp. 1001-1008.

Drechsler, R., et al., "Sympathy: Fast Exact Minimization of Fixed Polarity Reed-Muller Expressions for Symmetric Functions", *IEEE ED&TC 1995, Proceedings European Design and Test Conference*, (Mar. 6-9, 1995), 91-97.

Fleisher, H, "Combinatorial Techniques for Performing Arithmetic and Logical Operations", *IBM Research Center, RC-289, Research Report*, (Jul. 18, 1960) 22 pages.

Foster, Caxton, et al., "Counting Responders in an Associative Memory", *The Institute of Electrical and Electronics Engineers, Inc.*, Reprinted, with permission, from IEEE Trans. Comput. C-20:1580-1583, (1971), pp. 86-89.

Goto, et al., "A 54×54-b Regularly Structured Tree Multiplier", *IEEE Journal of Solid-State Circuits*, vol. 27, No. 9, (Sep. 1992), 1229-1236.

Hekstra, et al., "A Fast Parallel Multiplier Architecture", *IEEE International Symposium on Circuits and Systems: Institute of Electrical and Electronic Engineers*, c1977-c1996, 20v. :ill. :28cm, (1992), 2128-2131.

Ho, I., et al., "Multiple Addition by Residue Threshold Functions and Their Representation By Array Logic", *The Institute of Electrical and Electronics Engineers, Inc.*, Reprinted, with permission from IEEE Trans. Comput. C-22:762-767, (1973), pp. 80-85.

Jones, Jr., Robert, et al., "Parallel Counter Implementation", *Conf. Rec. 26th Asilomar Conf. Signals, Systems & Computers*, 1, (1992), pp. 381-385.

Knowles, S., "A Family of Adders", *Proc. 14th IEEE Symp. on Computer Arithmetic*, (1999), 30-34.

Koc, C, "High-Speed RSA Implementation", available at ftp://ftp.rsasecurity.com/pub/pdfs/tr201.pdf., Version 2.0, (Nov. 1994), 73 pages.

Koc, C, "RSA Hardware Implementation", available at ftp://ftp.rsasecurity.com/pub/pdfs/tr801.pdf., Version 1.0, (Aug. 1995), 30 pages.

Kogge, P. M., et al., "A Parallel Algorithm for the Efficient Solution of a General Class of Recurrence Equations", *IEEE Trans. Computers*, vol. C-22, No. 8, (Aug. 1973), 786-793.

Ladner, Richard E., et al., "Parallel Prefix Computation", *Journal of ACM*, vol. 27, No. 4, (Oct. 1980), 831-838.

Ling, Huey, "High-Speed Binary Adder", *IBM Journal of Research and Development*, vol. 25, No. 3, (1981), 156-166.

Monteiro, J., et al., "Bitwise Encoding of Finite State Machines", *Proceedings of the 7th International Conference on VLSI Design*, (Jan. 1994), pp. 379-382.

Nienhaus, H., "Efficient Multiplexer Realizations of Symmetric Functions", *IEEE*, (1981), pp. 522-525.

Oklobdzija, V G., et al., "Improving multiplier design by using improved column compression tree and optimized final adder in CMOS technology", *IEEE transactions on Very Large Scale Integration (VLSI) Systems*, IEEE, Inc, New York, vol. 3, No. 2, (1995), 292-301.

Sklansky, J., "Conditional-Sum Addition Logic", *IRE Trans.*, EC-9, (Jun. 1960), 226-231.

Swartzlander Jr., E E., "Parallel Counters", *IEEE Transactions on Computers*, C-22(11), (Nov. 1973), 1021-1024.

Vassiliadis, S., et al., "7/2 Counters and Multiplication with Threshold Logic", *IEEE*, (1997), pp. 192-196.

Villa, Tiziano, et al., "NOVA: State Assignment of Finite State Machines for Optimal Two-Level Logic Implementation", *IEEE Transactions on Computer-Aided Design*, vol. 9, No. 9, (Sep. 1990), 905-924.

Wallace, C., "A Suggestion for a Fast Multiplier", *IEEE Transactions on Electronic Computers*, vol. EC-13, (1964), pp. 14-17.

Weinberger, A., et al., "A Logic for High-Speed Addition", *Nat. Bur. Stand. Circ.*, 591, (1958), 3-12.

Zuras, D, et al., "Balanced delay trees and combinatorial division in VLSI", *IEEE Journal of Solid State Circuits*, SC-21, IEEE Inc, New York, vol. SC-21, No. 5, (1986), 814-819.

\* cited by examiner

PRIOR ART

| M2 | M1 | M0 | Action | A | S | X2 | BMX output |
|----|----|----|--------|---|---|----|-----------|
| 0 | 0 | 0 | multiply by 0 | 1 | 1 | 1 | 0 |
| 0 | 0 | 1 | multiply by 1 | 0 | 1 | 0 | N1 |
| 0 | 1 | 0 | multiply by 1 | 0 | 1 | 0 | N1 |
| 0 | 1 | 1 | multiply by 2 | 0 | 1 | 1 | N0 |
| 1 | 0 | 0 | multiply by -2 | 1 | 0 | 1 | ¬N0 |
| 1 | 0 | 1 | multiply by -1 | 1 | 0 | 0 | ¬N1 |
| 1 | 1 | 0 | multiply by -1 | 1 | 0 | 0 | ¬N1 |
| 1 | 1 | 1 | multiply by 0 | 1 | 1 | 1 | 0 |

Figure 5

PRIOR ART

*Redundant form of* 3×N (16 bit):
N  • • • • • • • • • • • • • • • •
2N • • • • • • • • • • • • • • •

*4-bit adders to be applied:*
N  | • • • | • • • • | • • • • | • • • • | •
2N | • • • • | • • • • | • • • • | • • • • |

*the result representing* 3×N:
3N • • • • • • • • • • • • • • • •
carries •       •       •       •

*reducing* Bias+3×N (Bias=$8736_{dec}$=$100010001000000_{bin}$)
3N • • • • • • • • • • • • • • • •
carries       •       •       •
           1 0 0 0 1 0 0 0 1 0 0 0 0 0 0

*Biased partially redundant form of a number* (Bias+X)
• • • • • • • • • • • • • • • • •
      •       •       •

*The inverse* (Bias-X= -(Bias+X)+2×Bias) *can be represented in the form*
• • • • • • • • • • • • • • • • • •
      1 1 1 • 1 1 1 • 1 1 1 •
                              1                     1
2×Bias        1 0 0 0 1 0 0 0 1 0 0 0 0 0 0

PRIOR ART

PRIOR ART

| M3 | M2 | M1 | M0 | Action | BMX output | A | S | X01 | X12 | X23 |
|---|---|---|---|---|---|---|---|---|---|---|
| 0 | 0 | 0 | 0 | multiply by 0 | 0 | 1 | 1 | 0 | 0 | 0 |
| 0 | 0 | 0 | 1 | multiply by 1 | N2 | 0 | 1 | 1 | 0 | 0 |
| 0 | 0 | 1 | 0 | multiply by 1 | N2 | 0 | 1 | 1 | 1 | 0 |
| 0 | 0 | 1 | 1 | multiply by 2 | N1 | 0 | 1 | 0 | 1 | 0 |
| 0 | 1 | 0 | 0 | multiply by 2 | N1 | 0 | 1 | 0 | 1 | 1 |
| 0 | 1 | 0 | 1 | multiply by 3 | Nx | 0 | 1 | 1 | 1 | 1 |
| 0 | 1 | 1 | 0 | multiply by 3 | Nx | 0 | 1 | 1 | 0 | 1 |
| 0 | 1 | 1 | 1 | multiply by 4 | N0 | 0 | 1 | 0 | 0 | 1 |
| 1 | 0 | 0 | 0 | multiply by -4 | ¬N0 | 1 | 0 | 0 | 0 | 1 |
| 1 | 0 | 0 | 1 | multiply by -3 | ¬Nx | 1 | 0 | 1 | 0 | 1 |
| 1 | 0 | 1 | 0 | multiply by -3 | ¬Nx | 1 | 0 | 1 | 1 | 1 |
| 1 | 0 | 1 | 1 | multiply by -2 | ¬N1 | 1 | 0 | 0 | 1 | 1 |
| 1 | 1 | 0 | 0 | multiply by -2 | ¬N1 | 1 | 0 | 0 | 1 | 0 |
| 1 | 1 | 0 | 1 | multiply by -1 | ¬N2 | 1 | 0 | 1 | 1 | 0 |
| 1 | 1 | 1 | 0 | multiply by -1 | ¬N2 | 1 | 0 | 1 | 0 | 0 |
| 1 | 1 | 1 | 1 | multiply by 0 | 0 | 1 | 1 | 0 | 0 | 0 |

Figure 8

PRIOR ART

PRIOR ART

PRIOR ART

METHOD AND DEVICE FOR PERFORMING OPERATIONS INVOLVING MULTIPLICATION OF SELECTIVELY PARTITIONED BINARY INPUTS USING BOOTH ENCODING

REFERENCE TO RELATED APPLICATION

The present application claims priority under 35 U.S.C. 119 to U.S. Provisional Patent Application No. 60/458,776, filed Mar. 28, 2003, which is hereby incorporated by reference.

FIELD OF THE INVENTION

The present invention relates to digital electronic devices, and in particular to a method and device for performing operations involving multiplication of selectively partitioned binary inputs using Booth encoding.

BACKGROUND OF THE INVENTION

Many digital electronic devices need to perform various arithmetic functions involving multiplication. Such hardware multipliers are an indispensable component of computer systems such as audio and video systems, simulators, computer games, speech and pattern recognition systems and image processing systems. The overall speed of such systems depends heavily on the speed of the internal hardware multipliers.

A multiplication of two numbers P and Q can be performed using a digital electronic device by calculating and summing a series of partial products. The numbers P and Q are commonly represented as twos complement binary digits, because this makes it straightforward to represent negative numbers.

In many applications it is necessary for a digital circuit to support a variety of data formats, for example, 32-bit data and 64-bit data. It is thus desirable to have an efficient algorithm for supporting such a variety of formats in a digital electronic circuit.

A variety of data formats may be supported by enabling the circuit to perform a process known as partitioned parallel multiplication. In a circuit that is designed to input two N-bit numbers and multiply them together, partitioned parallel multiplication involves splitting each N-bit input into two or more parts, and performing simultaneous independent multiplications of the first part of the first number times the first part of the second number, and the second part of the first number times the second part of the second number, etc. It is possible to use the same multiplication circuitry as for the N-bit×N-bit multiplication, except that all cross terms involving multiplications which do not relate to the same parts of both of the inputs, e.g. the first part of the first number times the second part of the second number, must be forced to zero to give the correct answer.

A circuit can be configured to allow partitioned parallel multiplication of input numbers in a single partitioned size or in one of a selection of different partitioned sizes, as well as allowing multiplication of input numbers of the full, non-partitioned size. For example, one circuit can be configured to give a choice between one 128 bit×128 bit multiplication, or in partitioned mode, two 64 bit×64 bit multiplications. Another circuit can be configured to give a choice between one 128 bit×128 bit multiplication, or in partitioned mode, a choice of two 64 bit×64 bit multiplications or four 32 bit×32 bit multiplications.

A general method of hardware multiplication is shown in the flowchart of FIG. 1. Two numbers P and Q, which are to be multiplied together, are input to an array generator at step S100. The array generator calculates an array of partial products, which is passed to an array reduction stage at step S101. In the array reduction stage, the partial products are added together to produce a sum of partial products and appropriate carry bits. At step S102, the carry bits are added to the sum of partial products, outputting the final product of the multiplication of P×Q. A network of carry save adders, such as a Wallace tree, may be used to add the partial products together.

FIG. 2 is a schematic diagram of an array of partial products generated when P and Q are partitioned into two. FIG. 3 is a schematic diagram of an array of partial products generated when P and Q are partitioned into four. As can be seen, only the diagonal partial products in the array are required and the off-diagonal or cross terms are set to zero.

Although it is possible to find the final product of P×Q by calculating a partial product for each binary digit of Q, and adding these partial products together, this can involve a very large number of partial products. It is time consuming to calculate and sum these partial products.

Booth encoding is a known technique that is used to reduce the number of partial products to be calculated and summed. In Booth encoding, the number Q is transformed into a format which is easier to multiply. Q is split into overlapping groups of adjacent bits, otherwise known as "multiplier groups", and each multiplier group is transformed into a format which can be used directly in a multiplexer circuit to select an appropriate partial product.

Two bit Booth Encoding

In two-bit Booth encoding (which is also known as radix-2 Booth encoding), Q is encoded in overlapping groups of three adjacent bits, where two bits in each group of three bits are shared with neighbouring groups, and the middle bit of each group is unique to that group. For example, for a 64 bit number Q[0:63], the first multiplier group is Q[1], Q[0], 0; the second is Q[3], Q[2], Q[1]; the third is Q[5], Q[4], Q[3], etc, and the last is Q[63], Q[62], Q[61], giving a total of 32 multiplier groups. The Booth encoding involves transforming the three bits of each multiplier group into a form which is easier to multiply. The partial product is calculated for each of the multiplier groups, and the partial products are then summed.

Without Booth encoding, a partial product would be obtained for each bit of Q (e.g. 64 partial products for a 64 bit Q). Each partial product is either zero or one times P, where the multiplication is P×Q. However, in 2-bit Booth encoding, only half as many partial products are obtained, because we are encoding in groups of three bits of which two are unique (and one is re-used from another group), i.e., the depth of the array illustrated in FIGS. 2 and 3 is halved by compressing the partial products into more complex partial products. The trade off for obtaining only half the number of partial products is that each partial product is more complex. In two bit Booth encoding, each partial product involves a multiply by −2, −1, 0, 1 or 2 operation, rather than being limited to a multiply by 0 or 1 operation.

A Booth encoder may be configured with one output corresponding each partial product which may be selected. The appropriate output is set to high when that particular partial product is selected, and is set to low otherwise. These outputs are then passed to the Booth multiplexer to obtain the partial product. For example, in two-bit Booth encoding where the possible partial products are multiplications by 2, 1, 0, −1 or −2, these may be represented by outputs of 2M, M, 0, −M, and −2M respectively.

Alternatively, a Booth multiplexer can be controlled using fewer outputs than one per partial product. For example, outputs from the Booth encoder may be in the form of M, 2M and S, where M represents multiplication by 1 or −1; 2M represents multiplication by 2 or −2; and S is a sign bit. For multiplication by zero, both M and 2M are set to zero. A first embodiment of the present invention is particularly suited to a Booth encoder with three outputs, A, S and X2, which are defined below, and which differ slightly from M, 2M and S. However, the present invention is not limited to a particular set of Booth encoder outputs, and may be used with any set of outputs which is appropriate.

FIG. 4 shows a hardware implementation, using logic gates, of a two-bit Booth encoder 110 (BENC) and a Booth multiplexer 120. The Booth encoder has inputs M2, M1 and M0, and outputs X2, A and S. The three inputs are for the three bits making up a single multiplier group. The outputs are defined as follows:

$$X2=(M0 \oplus M1)^c$$

$$A=M2+(M0+M1)^c$$

$$S=M2^c+M0 \bullet M1$$

where + signifies an OR operation, ● signifies and AND operation, ⊕ signifies an XOR operation, and $^c$ signifies a NOT operation.

X2 is the output of XNOR gate 115, which has inputs M0 and M1. A is the output of OR gate 114, which has two inputs: M2 and the output of NOR gate 113. NOR gate 113 has inputs M0 and M1. S is the output of NAND gate 112, which has inputs of M2 and the output of NAND gate 111. NAND gate 111 has inputs M0 and M1.

The purpose of the outputs is to control a multiplexer to select a correct partial product for each multiplier group. For example, for a multiplication of P×Q, the multiplier Q is divided into multiplier groups and each group is inputted into the M0, M1, M2 inputs of a Booth encoder. The outputs of the Booth encoder are then used to select between partial products of P ("multiply by one"), 2P ("multiply by two"), −P ("multiply by minus one"), −2P ("multiply by minus two") and zero ("multiply by zero").

The X2 output acts as an indicator of whether the selected partial product involves multiplication by an odd or even number. For those values of M2, M1, M0 that result in a "multiply by 2" or "multiply by −2" partial product, X2 will be 1. For those values of M2, M1, M0 that result in a "multiply by 1" or "multiply by −1" partial product, X2 will be 0.

The S output acts as an indicator of the sign of the partial product. For a partial product selection of "multiply by 0", "multiply by 1" or "multiply by 2", then S is set to 1. However, for a partial product selection of "multiply by −1" or "multiply by −2", then S is 0.

The A output acts together with S as an indicator of whether the selected partial product is "multiply by 0". If the partial product selected is "multiply by 0", then A and S are both 1. However, if the partial product selected in not "multiply by 0" (or "multiply by −0"), then A is the compliment of S, i.e. when S=1, then A=0, and when S=0, then A=1.

The Booth multiplexer 120 has five inputs and one output. Three of the five inputs are X2, A and S, which are the outputs of the Booth encoder 110. The other two inputs N0 and N1 are two consecutive bits of the number to be multiplied. In a multiplication of P x Q, where Q is input to the Booth encoder, the inputs N0 and N1 of the Booth multiplexer are two consecutive bits P[k], P[k−1] of the number P.

The output of the Booth multiplexer is a single bit PP of the partial product. Logically, $$PP=\{X2 \bullet [(N0 \bullet A^c)+(N0^c \bullet S^c)]+X2^c \bullet [(N1 \bullet A^c)+(N1^c \bullet S^c)]\}$$

To calculate all of the bits of a partial product, overlapping pairs of bits of P can be fed sequentially into the Booth multiplexer 120, and the output bit PP for each can be stored. Alternatively, a plurality of Booth multiplexers can be provided for each Booth encoder, preferably one for each bit of the partial product to be obtained. All of the bits of the partial product may then be calculated in parallel, which is much faster than calculating them sequentially.

As shown in FIG. 4, the first stage of the Booth multiplexer 120 is a 2:1 multiplexer 121 with inputs N0 and N1. The address line is X2, and the output is Z, which is an intermediate output and is used as an input to the second stage of the Booth multiplexer 120. If X2 is 0 (i.e. multiplication by 1 or −1), the multiplexer 121 selects and outputs the N1 bit. If X2 is 1 (i.e. multiplication by an even number), the multiplexer 121 selects and outputs the N0 bit. Thus when a multiplication by 2 or −2 is to be performed, the first multiplexer stage 121 of the Booth multiplexer 120 performs a bit shift, which is the simplest way of performing a two times multiplication in binary. When multiplication by 1 or −1 is to be performed, the multiplexer 121 selects the N1 bit, and no such bit shift is performed.

The second stage of the Booth multiplexer 120 is a 2:1 multiplexer 122 with inputs A and S, and the output Z from the first stage 121 as an address line. The value of A is selected and inverted by the inverter 123 when Z=1 and the value of S is selected and inverted by the inverter 123 when Z=0. If multiplication by zero is required, then both A and S are set to 1, so the output PP will be 0, regardless of the value of Z.

If multiplication by 1, 2, −1 or −2 is required, then A and S will have complementary values, i.e. for multiplication by 1 or 2, A=0 and S=1, and for multiplication by −1 or −2, A=1 and S=0. Thus, for a positive multiplication, the selected value A or S is equal to the value of Z, and for a negative multiplication, the selected value A or S is equal to NOT Z. Thus the output PP corresponds to multiplication by the correct sign. For negative numbers, the output from the Booth multiplexer is the complement of the corresponding positive number. To convert this to twos complement format, it is necessary to add one to the complete partial product.

In addition, for negative partial products, the most significant bits should be sign extended to allow correct array reduction, due to the 2s compliment format of the binary numbers.

FIG. 5 is a table of inputs and outputs of a two-bit Booth encoder. A list of all possible combinations of the input values, M2, M1 and M0, is shown in the first three columns on the left hand side of the table. For a multiplication of P×Q, the bits in these first three columns of the table will correspond to the possible bit combinations of each multiplier group of Q. The next column of the table describes, for each combination of input values M2, M1, M0, the action which must be performed on the number P to obtain the correct partial product. The next three columns of the table show the values of the outputs A, S and X2 of the Booth encoder 110. The last column of the table shows the values of the single bit partial product output PP of the Booth multiplexer 120, when the input to the multiplexer 120 includes the N0, N1 bits of P.

Each Booth encoder 110 is used to calculate a single partial product. To calculate the total product of P×Q, a plurality of Booth encoders may be provided, with one for every multiplier group of Q.

Three Bit Booth Encoding

In three-bit Booth encoding (which is also known as radix-3 Booth encoding), a number Q is encoded in overlapping groups of four bits, where two of the four bits are shared with adjacent groups, and the other two of the four bits are unique to one group. This reduces the number of partial products by a factor of three.

However, this reduction in number of partial products comes at a price, because in practice it is not straight forward to calculate the "multiply by 3" partial product.

Negative partial products can easily be calculated by inverting the values of the bits and adding 1. "Multiply by 2" and "multiply by 4" partial products can easily be calculated by performing a bit shift. However, the "multiply by 3" partial product cannot be calculated by such straight forward methods, and can only be calculated directly by using a carry propagate adder arrangement. The carry propagate adder increases the latency, due to the long wires that are required for propagating carries from less significant to more significant bits, hence also increasing the time needed to perform a calculation.

A known solution to this problem is to use a modified form of 3-bit Booth encoding, such as fully redundant 3-bit Booth encoding or partially redundant 3-bit Booth encoding.

FIG. 6 illustrates the methods of redundant and partially redundant 3-bit Booth encoding. Firstly, the fully redundant form of a 3N (i.e. a "multiply by 3") partial product of a 16 bit number is shown. In the fully redundant form, the 3N partial product consists of a sum of two partial products which are easier to calculate, i.e. a sum of the N (i.e. "multiply by 1") and 2N (i.e. "multiply by 2") partial products. The 2N partial product can easily be found by performing a bit shift, and the N partial product requires no transformation. FIG. 6 shows a representation of each bit as a dot, and the fully redundant form is represented by two rows of 16 dots, where one row is shifted one place with respect to the other row. The complete partial product is represented by the sum of the two rows.

Of course, the trade-off to avoiding direct calculation of the 3N partial product is that there are now twice as many partial products to be summed. A compromise is provided by using partially redundant Booth encoding. The partially redundant form is obtained from the fully redundant form by using a series of small length adders to sum the 2N and N values, but keeping the carrier bits between adders, rather than propagating these carrier bits from one adder to the next.

In FIG. 6, the small length adders are represented by boxes surrounding groups of dots to be added. The output of the adders is represented as a row of 16 dots, and the carrier bits between adders is represented as a further 3 dots which are positioned in the proper columns, to be added to the output of the adders. In this example, 4-bit adders are used. The adders are small to avoid carry propagation over large distances, because this would introduce a significant time delay. However, the use of the adders reduces the number of bits needing to be summed. In the example shown, the adders reduce the number of bits to be summed from 32 to 19 (which is one 16 bit number plus 3 carry bits).

However, this partially redundant representation does not take the same form for both positive and negative multiples. Thus, difficulties can arise when dealing with negative numbers. The problem can be solved using biasing. Each partial product has a bias constant added to it before being summed to form the final product. The bias constant is the same for both positive and negative multiples, but it may be different for different partial products. As shown in the figure, a biasing constant which effectively adds 1 to each carry bit is chosen, i.e. the bias constant is 1000100010000. Each carry bit, plus corresponding bias constant bit, plus corresponding bit of the 16 bit adder output is then summed, and the result can be represented in biased partially redundant form as a row of 16 bits plus three correctly positioned carry bits. In FIG. 6, these sums of three bits are represented by a ring around each set of three bits to be summed.

As shown in FIG. 6, the inverse of the biased partially redundant form can easily be represented, by complementing all of the non-blank bits of the partially biased redundant form, and adding 1. This is the same procedure which is used to obtain the negative of a number in its non-redundant form.

FIG. 7 shows a circuit for three-bit Booth encoding. The circuit has a Booth encoder 210 and a Booth multiplexer 220. The Booth encoder 210 has inputs M0, M1, M2 and M3 and outputs A, S, X01, X12 and X23. The four inputs are for the four bits making up a single multiplier group. The outputs are defined as follows:

$$X01 = M0 \oplus M1$$

$$X12 = M1 \oplus M2$$

$$X23 = M2 \oplus M3$$

$$A = M3 + (M0 + M1 + M2)^c$$

$$S = M3^c + (M0 \bullet M1 \bullet M2)$$

Output X01 is the output of an XOR gate 217, which has inputs M0 and M1. Output X12 is the output of an XOR gate 216, which has inputs M1 and M2. Output X23 is the output of an XOR gate 215, which has inputs M2 and M3. Output A is the output of OR gate 214, which has inputs of M3 and the output of XOR gate 213. XOR gate 213 has inputs M0, M1 and M2. Output S is the output of NAND gate 212, which has inputs of M3 and the output of NAND gate 211. NAND gate 211 has M0, M1 and M2 as inputs.

The outputs X01, X12 and X23 indicate what magnitude of multiple is needed to calculate the partial product. X01 indicates whether a bit shift is needed at all (i.e. a 2N or 4N partial product is selected), or whether a selection is to be made between the N and 3N partial products. X23 selects between the N and 3N partial products when X01=1, and is ignored when X01=0. X12 selects between the 2N and 4N partial products when X01=0, and is ignored when X01=1. The outputs S and A have a similar purpose to that in the two-bit Booth encoder, i.e. indicating the sign of the partial product, and whether the partial product is zero.

The Booth multiplexer 220 has nine inputs and one output. Five of the nine inputs are X01, X12, X23, A and S, which are the outputs of the Booth encoder 210. Three of the other four inputs, N0, N1 and N2, are three adjacent bits of the number to be multiplied. The last input, Nx, is for a "multiply by 3" type of partial product.

The first stage of the Booth multiplexer 220 comprises a 4:1 multiplexer circuit 221. The inputs are N0, N1, Nx and N2, and the output is Z, which is an intermediate output and is used as an input to the second stage of the Booth multiplexer 220. For a multiplication by 1, no bit shift is needed, and N2 is selected and output. For a multiplication by 2, a single bit shift is needed, and N1 is selected and output. For a multiplication by 4, a double bit shift is needed and N0 is selected and output. For a multiplication by 3, Nx is selected and output.

The second stage of the Booth multiplexer 220 comprises a 2:1 multiplexer circuit 222. This operates in a similar way to that described for the two-bit Booth encoding, where the output bit PP is either complemented or not, depending on the sign of the partial product, and is set to 0 if the partial product is zero. The multiplexers 221 and 222 and the inverter 223 operate in a similar manner to the multiplexers 121 and 122 and the inverter 123 in the embodiment of FIG. 4.

FIG. 8 is a table of inputs and outputs for three bit Booth encoding. The first four columns show a list of all possible values of the inputs M3, M2, M1, M0. The next column shows the action to be performed on the number to be multiplied, in order to obtain the partial product, e.g. multiply by 0. The next column shows the value of the single bit partial product output PP of the Booth multiplexer 220, when the inputs to the multiplexer 220 includes the three consecutive bits N2, N1, N0 of the number to be multiplied, and the multiply by three bit Nx. The last five columns show the values of the outputs A, S, X01, X12 and X23 of the Booth encoder 210.

As discussed above, in a circuit capable of carrying out partitioned parallel multiplication, it is necessary to be able to force all cross products bits to zero (as illustrated in FIGS. 2 and 3), to prevent one set of numbers to be multiplied together from affecting the result of the other multiplication(s). FIGS. 9a, 9b and 9c show prior art schemes for forcing these cross product terms to zero during parallel partitioned multiplication. In each case, a control signal T is used to select between normal multiplication and partitioned parallel multiplication.

FIG. 9a shows the scheme adopted by U.S. Pat. No. 5,943,250, U.S. Pat. No. 6,035,318 and U.S. Pat. No. 6,223,198. These three patents disclose a process for Booth encoding and Booth multiplexing in the usual way, to obtain a sequence of partial product bits. Once the partial product bit have been obtained from the Booth multiplexer, all bits corresponding to cross product terms (e.g. a first part of the first number times a second part of the second number, or a second part of the first number times a first part of the second number) are passed through an AND gate with a NOT T control signal on the other input. The AND gate turns all of the cross product bits low when T is high. Therefore the final output gives the product of the two (or more) independent multiplications. However, this scheme has the considerable disadvantage that it is necessary to add an extra AND gate to every Booth multiplexer. This is very area expensive, and it also introduces extra time delay by adding extra logic to the critical path.

FIGS. 9b and 9c show an alternative prior art scheme, which is described in U.S. Pat. No. 6,353,843. As shown in FIG. 9b, two Booth encoders 310, 311 are provided in parallel with each other. One has a set of inputs appropriate to T=0, and the other has a set of inputs equal to T=1. A multiplexer 312 is then used to select between the two Booth encoders 310, 311, using T as the address bit to make the selection. Again, this solution involves adding logic to the critical path, which adds a time delay. A further problem is that if more than one partitioning is to be enabled, then it is necessary to use extra Booth encoders. FIG. 9c shows an example in which the input number may be partitioned two parts or four parts, or may remain unpartitioned. Separate Booth encoders 320, 321, 322 are provided for each of these partitioning options. Also, a 3:1 multiplexer 323 is needed, rather than a simpler 2:1 multiplexer. This all adds to the cost and complexity of the circuit.

The prior art firstly determines the cross product multiples, and then forces them to zero after the Booth encoding.

SUMMARY OF THE INVENTION

In the present invention, an efficient scheme is disclosed for allowing partitioned parallel multiplication. Embodiments of the present invention set the cross product multiples to zero during the Booth encoding.

One aspect of the present invention provides Booth encoder circuit for generating Booth encoded output bits for a first multi bit binary input for use in a process including, in a selectable manner, either: multiplying together the first multi bit binary input and a second multi bit binary input, or multiplying together groups of bits of said first multi bit binary input and groups of bits of said second multi bit binary input where the first and second multi bit binary inputs are each partitioned into N groups, where N is an integer of two or more, the Booth encoder circuit comprising: input connections for receiving a plurality of adjacent bits of the first multi bit binary input; an encoder control input connection for receiving a control input for selecting between said multiplication of first and second multi bit binary inputs and said multiplication of said groups of bits of said first multi bit binary input and said groups of bits of said second multi bit binary input; encoder logic to Booth encode said received bits of said first multi bit binary input to either generate unmodified Booth encoded output bits or modified Booth encoded output bits in dependence upon said received control input; and output connections for outputting the generated Booth encoded output bits for use by selector logic to select a partial product bit in dependence upon the generated Booth encoded output bits and adjacent bits of said second multi bit binary input.

In one embodiment the encoder logic comprises an arrangement of logic gates for encoding the bits of the first multi bit binary input, and the encoder control input connection is connected as an additional input for at least one of the logic gates.

In one embodiment the encoder control input is arranged to receive a single bit control input.

In one embodiment the encoder logic is arranged to set a plurality of bits of the modified Booth encoded output to a state dependent upon the control input.

In one embodiment the encoder logic is arranged to set two bits of the modified Booth encoded output high in response to the control input.

In one embodiment the encoder logic is adapted to generate the unmodified Booth encoded output bits as a plurality of bits indicating a multiplication factor to be used in calculating the partial product, and to generated the modified generated Booth encoded output bits as a plurality of bits at least one of which is set to a state dependent upon the control input.

In one embodiment the encoder logic is adapted to generate one of the unmodified Booth encoded output bits to include a sign bit to indicate the sign of the multiplication factor and to modify said sign bit in dependence upon the control input in the generation of the modified Booth encoded output bits.

In one embodiment the encoder logic is adapted to generate one of the unmodified Booth encoded output bits as a zero-indicator bit which takes the same value as the sign bit to select a multiplication factor of zero and which takes the opposite value to the sign bit to select a non-zero multiplication factor, and to modify said zero-indicator bit in dependence upon the control input in the generation of the modified Booth encoded output bits.

In one embodiment the encoder logic is adapted to generate a subset of the unmodified and modified Booth encoded output bits as one or more magnitude bits which indicate the magnitude of a non-zero multiplication factor.

In one embodiment the input connections are arranged to receive three adjacent bits of the first multi bit binary input.

In one embodiment the input connections are arranged to receive four adjacent bits of the first multi bit binary input.

One embodiment of the present invention provides a digital circuit for generating a partial product bit for use in a process including, in a selectable manner, either: multiplying together the first multi bit binary input and a second multi bit binary input, or multiplying together groups of bits of said first multi bit binary input and groups of bits of the second multi bit binary input where the first and second multi bit binary inputs are each partitioned into N groups, where N is an integer of two or more, the digital circuit comprising: the Booth encoder circuit as hereinabove described; and a selector having input connections for receiving adjacent bits of the second multi bit binary input and Booth input connections connected to the output connections of the Booth encoder circuit for receiving the generated Booth encoded output bits, and selector logic for selecting and outputting a partial product bit using the adjacent bits of the second multi bit binary input and the generated Booth encoded output bits.

In one embodiment the selector logic comprises first selector logic having selection inputs connected to the input connections and at least one selector input connected to at least one of he Booth input connections for selecting from the adjacent bits of the second multi bit binary input on the basis of at least one the generated Booth encoded output bits, and second selector logic having selection inputs connected to a plurality of the Booth input connections and at least one selector input connected to the output of the first selector logic for selecting from the generated Booth encoded output bits on the basis of the output of the first selector logic.

In one embodiment the first selector logic receives at least one generated Booth encoded output bit representing a multiplication factor to be used in the calculation of the partial product on the at least one selector input.

In one embodiment the second selector logic receives two of the generated Booth encoded output bits on the selection inputs, the generated Booth encoded output bits representing the sign of the multiplication factor and whether or not the partial product should be zero for unmodified generated Booth encoded output bits or two said generated Booth encoded output bits representing a state dependent upon the control input for modified generated Booth encoded output bits.

One embodiment of the present invention provides a digital circuit for processing a first multi bit binary input and a second multi bit binary input to generate partial product outputs in a process including, in a selectable manner, either: multiplying together the first multi bit binary input and the second multi bit binary input, or multiplying together groups of bits of said first multi bit binary input and groups of bits of said second multi bit binary input where the first and second multi bit binary inputs are each partitioned into N groups, where N is an integer of two or more, the circuit comprising: a plurality of first digital circuits as hereinabove described; and a plurality of second digital circuits, each second digital circuit comprising Booth encoder logic for receiving groups of bits of said first multi bit binary number and for generating Booth encoded output bits, and selector logic for receiving adjacent bits of said second multi bit binary input and said generated Booth encoded output bits and for selecting and outputting a partial product bit using said adjacent bits of said second multi bit binary input and said generated Booth encoded output bits; wherein a first plurality of said first digital circuits are connected to a group of low significant bits of said first multi bit binary input, a group of high significant bits of said second multi bit binary input, and said control input, and a second plurality of said first digital circuits are connected to a group of high significant bits of said first multi bit binary input, a group of low significant bits of said second multi bit binary input, and said control input; a first plurality of said second digital circuits are connected to a group of high significant bits of said first multi bit binary input, a group of high significant bits of said second multi bit binary input, and said control input, and a second plurality of said second digital circuits are connected to a group of low significant bits of said first multi bit binary input, a group of low significant bits of said second multi bit binary input, and said control input.

In one embodiment the groups of high and low bits comprise (M-M/N) bits, where M is the number of bits of the first and second multi bit inputs and N is the number of groups into which the inputs are selectably partitioned by the control input.

One embodiment of the present invention provides a digital device as hereinabove described for performing computation including parallel partitioned multiplication, including control input generator logic to generate said control signal to select parallel partitioned multiplication.

One embodiment of the present invention provides a digital device as hereinabove described, wherein said control input generator logic is arranged to generate said control input as a plurality of bits indicative of the number of partitions for perform parallel partitioned multiplication using a choice of partition sizes.

One embodiment of the present invention provides a digital circuit for generating an output based on an operation involving multiplication of binary numbers comprising a digital circuit as hereinabove described for generating an array of partial products; array reduction logic for reducing the number of partial products in the array; and binary addition logic for adding the reduced partial products to generate an output.

One embodiment of the present invention provides a multiplication logic circuit comprising the digital circuit as hereinabove described for multiplying at least one pair of binary numbers, wherein the output is the multiplication of said at least one pair of binary numbers.

One embodiment of the present invention provides a multiply-accumulate logic circuit comprising the digital circuit as hereinabove described, including logic for accumulating previous multiplications.

One embodiment of the present invention provides an integrated circuit comprising the digital circuit as hereinabove described.

Another aspect of the present invention provides a method of generating Booth encoded output bits for a first multi bit binary input for use in a process including, in a selectable manner, either: multiplying together the first multi bit binary input and a second multi bit binary input, or multiplying together groups of bits of said first multi bit binary input and groups of bits of said second multi bit binary input where the first and second multi bit binary inputs are each partitioned into N groups, where N is an integer of two or more, the method comprising: receiving a plurality of adjacent bits of the first multi bit binary input; receiving a control input for selecting between said multiplication of first and second multi bit binary inputs and said multiplication of said groups of bits of said first multi bit binary input and said groups of bits of said second multi bit binary input; encoding said received bits of said first multi bit binary input to either generate unmodified Booth encoded output bits or modified Booth encoded output bits in dependence upon said received control input; and outputting the generated Booth encoded output bits for use by selector logic to select a partial product bit in dependence upon the generated Booth encoded output bits and adjacent bits of said second multi bit binary input.

The encoder control input may be a one-binary input to indicate partitioned mode or non partitioned mode. Alternatively, it may be a multiple bit binary input, which is particularly useful in the case where a selection is to be made between a choice of more than one different partition size. The multi bit control input can be input to each Booth encoder where logic is required to combine them, or each Booth encoder can receive only one bit of the control input. In this latter embodiment the connections must ensure that each booth encoder receives the appropriate bit of the control signal so as to set the partial products to zero as necessary.

The Booth encoder may be a two-bit Booth encoder, or a higher order Booth encoder, such as a three-bit Booth encoder. The selector may be a Booth multiplexer.

In embodiments of the present invention, the cross product multiples are set to zero during the Booth encoding, by forcing A and S to both be 1. This prevents additional logic components being added to the critical path, and it also avoids excessive use of extra components such as AND gates, or extra Booth encoders and multiplexers.

BRIEF DESCRIPTION OF THE DRAWINGS

FIG. 5 is a table showing the output values of the 2-bit Booth encoder and multiplexer of FIG. 4;

FIG. 6 shows an illustration of the coding scheme for fully redundant, partially redundant, and biased partially redundant Booth encoding;

FIG. 8 is a table showing the output values of the 3-bit Booth encoder and multiplexer of FIG. 7;

DETAILED DESCRIPTION OF EMBODIMENTS OF THE INVENTION

Figure 10:
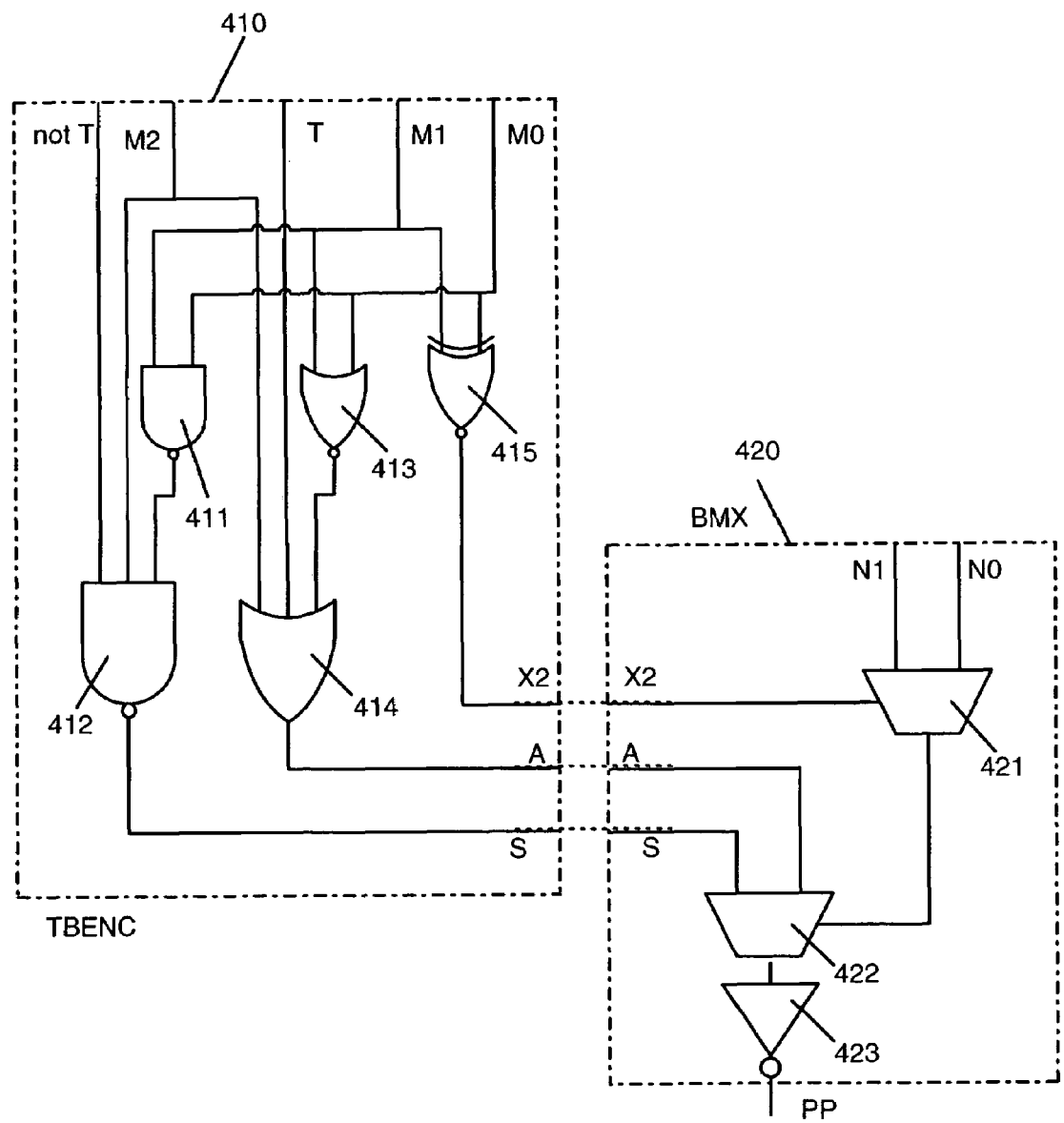
FIG. 10 is a schematic diagram of a 2-bit Booth encoder for use in partitioned parallel multiplication, according to a first embodiment of the invention.

FIG. 10 shows a hardware implementation, using logic gates, of a 2-bit Booth encoder 410 and Booth multiplexer 420 according to a first embodiment of the present invention. The Booth encoder has inputs T, not T, M2, M1 and M0, and outputs X2, A and S. As in the circuit of FIG. 4, the inputs M2, M1 and M0 are for the three bits making up a single multiplier group. The input T is a control input to indicate parallel partitioned mode, and "not T" is the complement of input T. Instead of T and "not T" being provided as two separate inputs, only one of the two may be provided as an input, but an additional NOT gate may be provided to derive the complement value of the input control signal.

The outputs are defined as follows:

$$X2=(M0 \oplus M1)^c$$

$$A=T+M2+(M0+M1)^c$$

$$S=T+M2^c+(M0 \bullet M1)$$

X2 is the output of XNOR gate 415, which has inputs M0 and M1. A is the output of OR gate 414, which has three inputs: T, M2 and the output of NOR gate 413. NOR gate 413 has inputs M0 and M1. S is the output of NAND gate 412, which has inputs of "not T", M2 and the output of NAND gate 411. NAND gate 411 has inputs M0 and M1.

Figure 3:
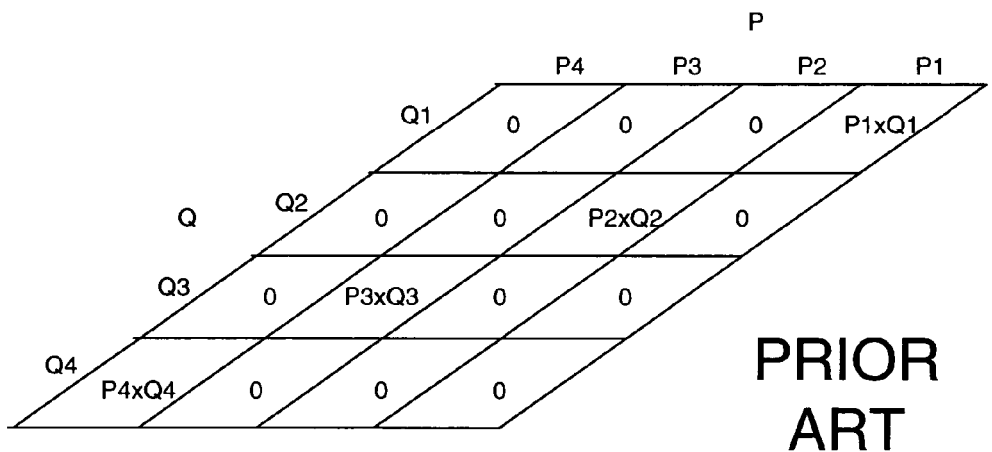
FIG. 3 is a schematic diagram of an array of partial products generated when P and Q are partitioned in four.
Figure 4:
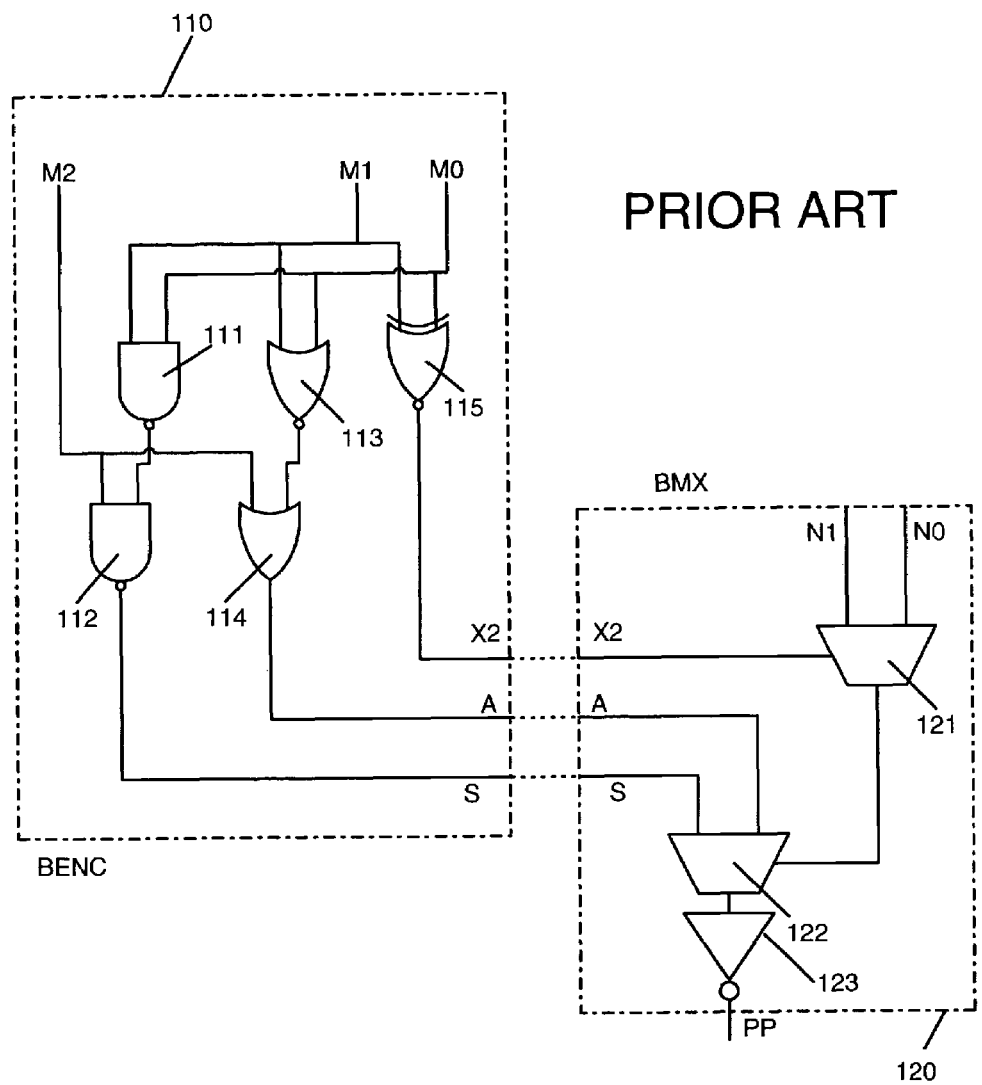
FIG. 4 is a schematic diagram of a 2-bit Booth encoder and multiplexer.

Similarly to the circuit of FIG. 4, the X2 output acts as an indicator of whether the selected partial product is odd or even, the S output acts as an indicator of the sign of the partial product, and the A output acts together with S as an indicator of whether the partial product is set to zero. When T=0 then the circuit behaves in the same way as that of FIG. 2, and the outputs A, S and X2 are those shown in the table of FIG. 3. However, when T=1, the A and S outputs are both forced to 1, regardless of the values of M0, M1 and M2, because NAND gate 412 and OR gate 414 are set to high by the T and "not T" inputs. An output of A=1 and S=1 corresponds to selection of the zero partial product.

The X2, A and S outputs of the Booth encoder 410 are all inputs to the Booth multiplexer 420. The Booth multiplexer 420 comprises two multiplexers 421 and 422 and an inverter 423 and also has two consecutive bits N0, N1 of the multiplicand as inputs. The output is a bit from the partial product, PP. The Booth multiplexer 420 works in the same way as the Booth multiplexer in FIG. 4. When T=1, the Booth multiplexer will set each output bit to one, corresponding to an output value of zero, because the A and S inputs have already been set to one by the Booth encoder 410.

Figure 11:
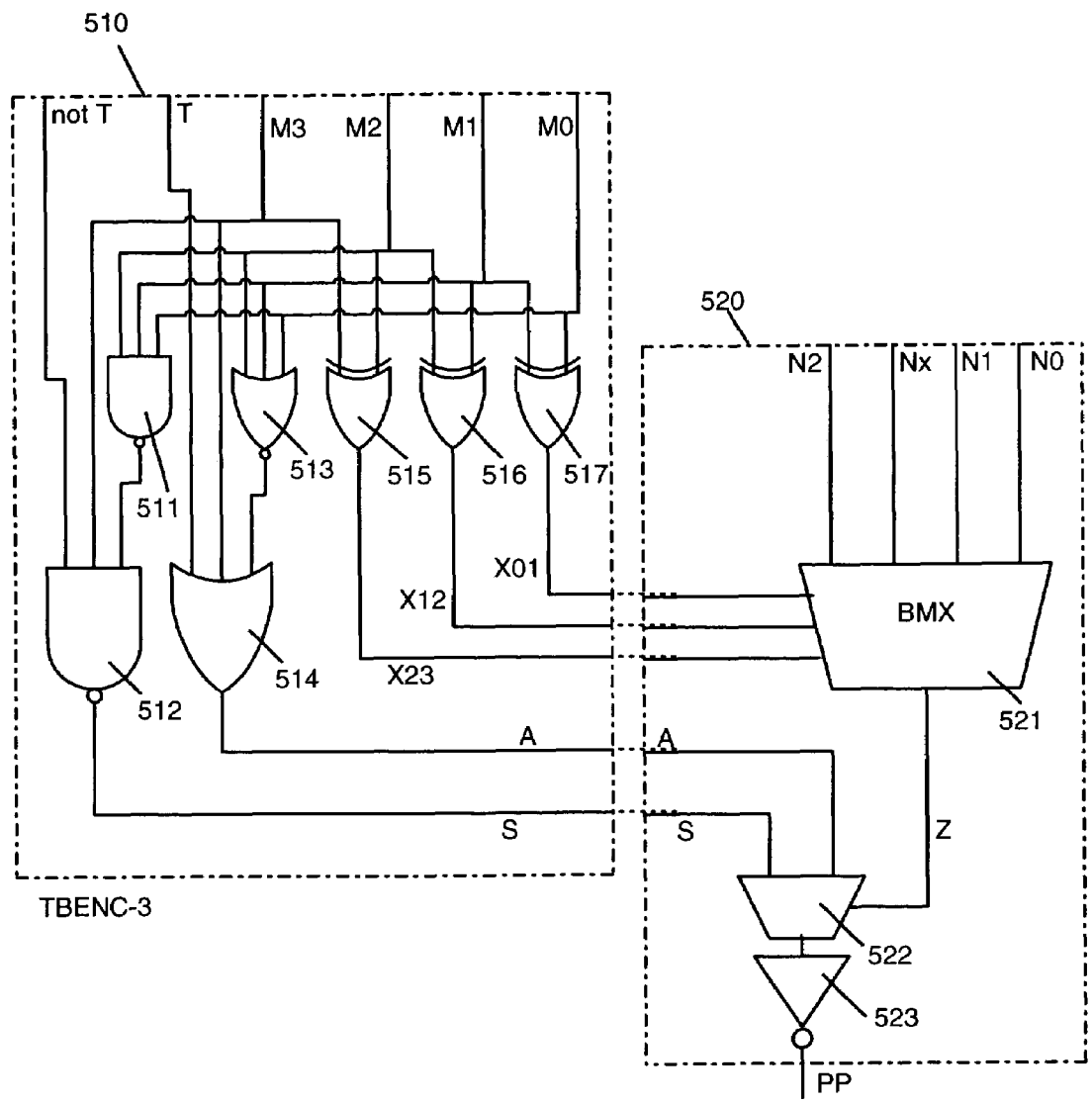
FIG. 11 is a schematic diagram of a 3-bit Booth encoder for use in partitioned parallel multiplication, according to a second embodiment of the invention.

FIG. 11 shows a circuit according to a second embodiment of the invention, for a 3-bit Booth encoder 510 and multiplexer 520. The Booth encoder 510 has inputs T, "not T", M0, M1, M2 and M3 and outputs A, S, X01, X12 and X23. The inputs M0, M1, M2 and M3 are for the four bits making up a single multiplier group. The input T is a control input, and the input "not T" is the complement of input T.

The outputs are defined as follows:

$$X01=M0 \oplus M1$$

$$X12=M1 \oplus M2$$

$$X23=M2 \oplus M3$$

$$A=T+M3+(M0+M1+M2)^c$$

$$S=T+M3^c+(M0 \bullet M1 \bullet M2)$$

Output X01 is the output of an XOR gate 517, which has inputs M0 and M1. Output X12 is the output of an XOR gate 516, which has inputs M1 and M2. Output X23 is the output of an XOR gate 515, which has inputs M2 and M3. Output A is the output of OR gate 514, which has inputs of T, M3 and the output of XOR gate 513. XOR gate 513 has inputs M0, M1 and M2. Output S is the output of NAND gate 512, which has inputs of "not T", M3 and the output of NAND gate 511. NAND gate 511 has M0, M1 and M2 as inputs.

Figure 7:
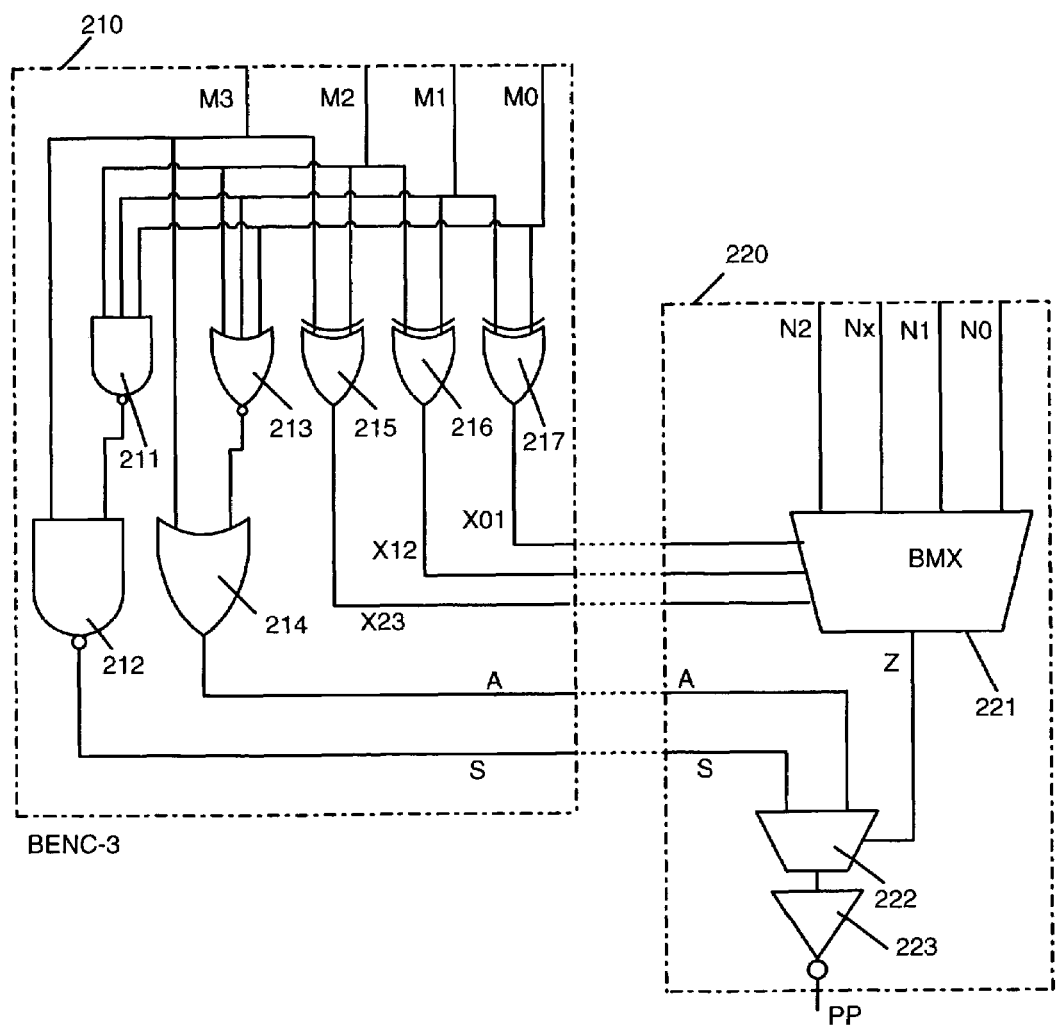
FIG. 7 is a schematic diagram of a 3-bit Booth encoder and multiplexer.
Figure 9A:
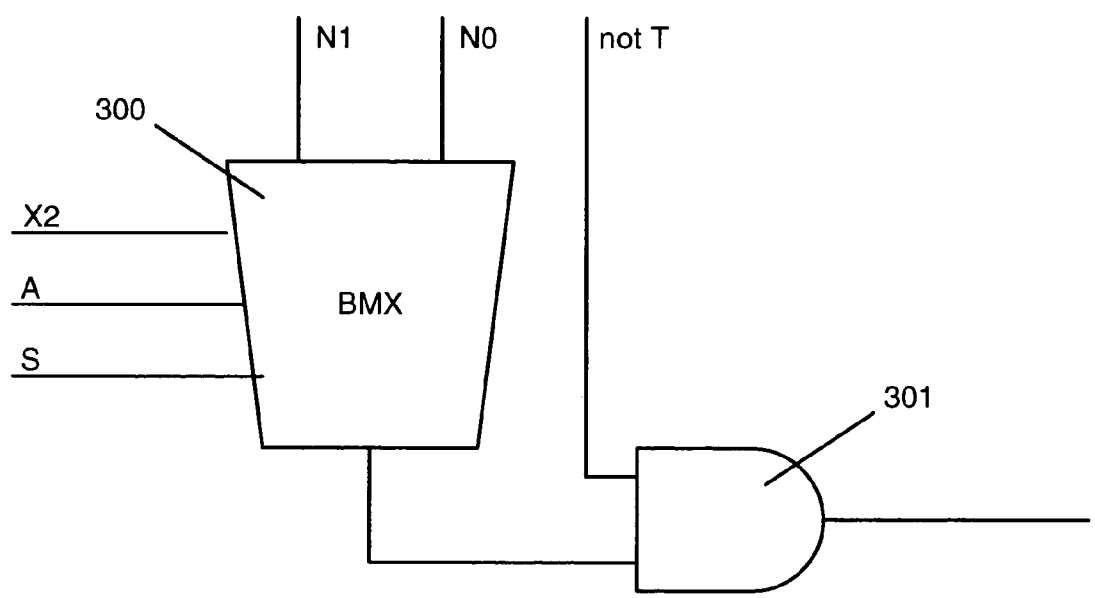
FIGS. 9a, 9b and 9c are schematic diagrams of circuits for partitioned parallel multiplication, according to the prior art.
Figure 9B:
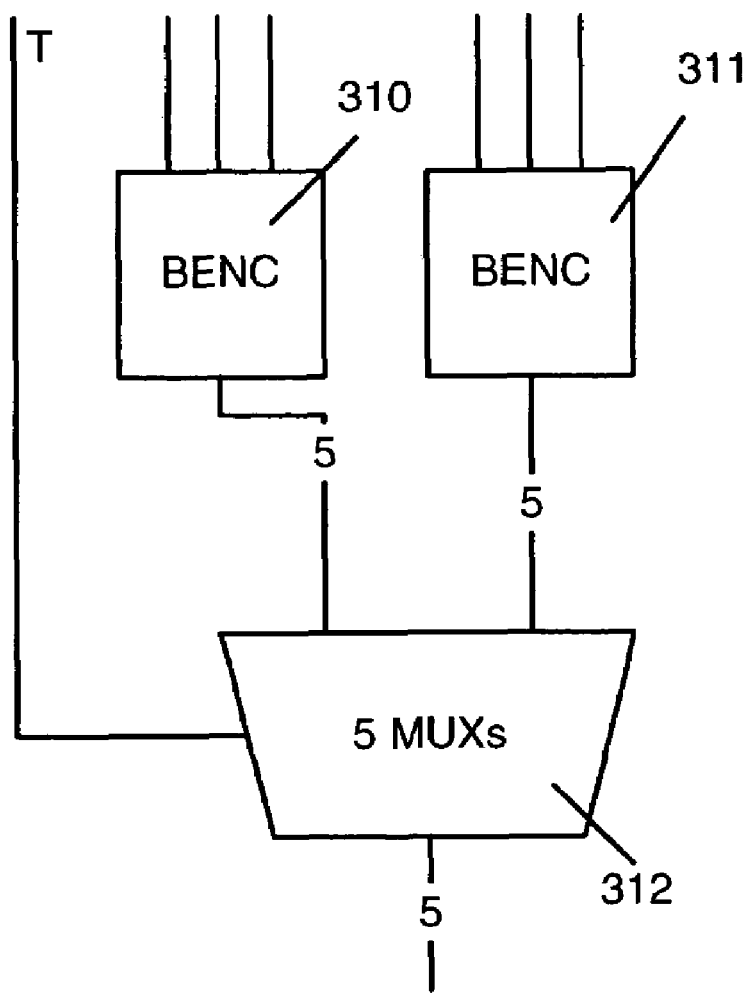
Figure 9C:
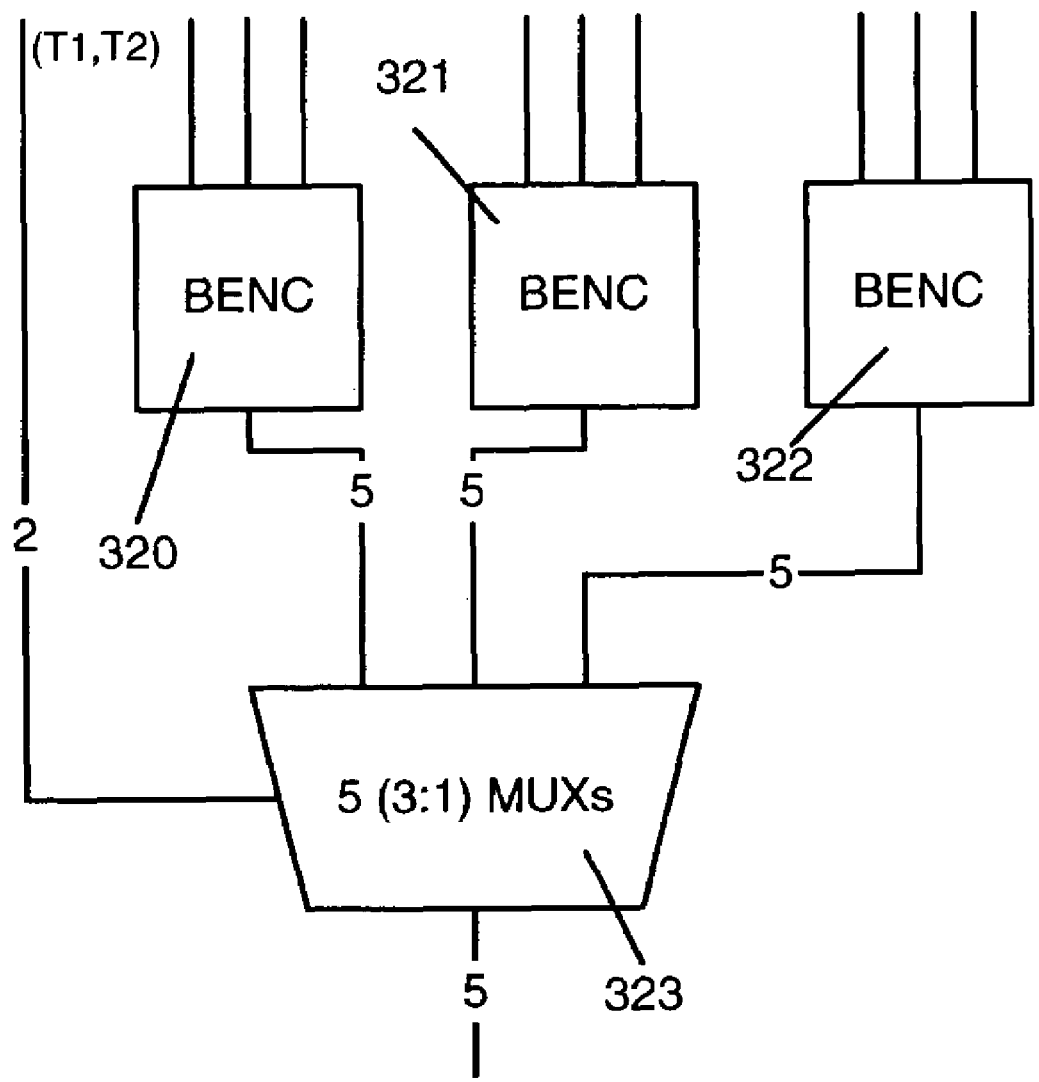

Similarly to the circuit of FIG. 7, the X01, X12 and X23 outputs act as an indicator of whether a bit shift or a multiply by 3 is required. The S output acts as an indicator of the sign of the partial product, and the A output acts together with S as an indicator of whether the partial product is set to zero. When T=0 then the circuit behaves in the same way as that of FIG. 7, and the outputs A, S, X01, X12 and X23 are those shown in the table of FIG. 5. However, when T=1, the A and S outputs are both forced to 1, regardless of the values of M0, M1, M2 and M3, because NAND gate 512 and OR gate 514 are set to high by the T and "not T" inputs. An output of A=1 and S=1 corresponds to selection of the zero partial product.

The X01, X12, X23, A and S outputs of the Booth encoder 510 are all inputs to the Booth multiplexer 520. The Booth multiplexer 520 also has three consecutive bits N0, N1, N2 of the multiplicand as inputs. The last input, Nx, is for a "multiply by 3" type of partial product. The output of the Booth multiplexer 520 is a bit from the partial product, PP. The Booth multiplexer 520 works in the same way as the Booth multiplexer in FIG. 7 and comprises two multiplexers 521 and 522 and an inverter 523. When T=1, the Booth multiplexer will set each output bit to one, corresponding to an output value of zero, because the A and S inputs have already been set to one by the Booth encoder 410.

The Booth encoder shown in FIGS. 10 and 11 will set all output partial product bits to zero when T=1. In parallel partitioned mode, we only want to set the cross term partial product bits to zero, to avoid the result of one multiplication affecting the result of another independent multiplication. Therefore, to correctly calculate the partial products, we need to use a combination of Booth encoders with a T input, and normal Booth encoders. For example, where a pair of input numbers are each divided into first and second parts, a Booth encoder with a multiplier group from the first part of the first input number must send a zero partial product output to those Booth multiplexers that have inputs from the second part of the second number, but it must not force the partial product to zero for those Booth multiplexers that have inputs from the first part of the second number.

Figure 12:
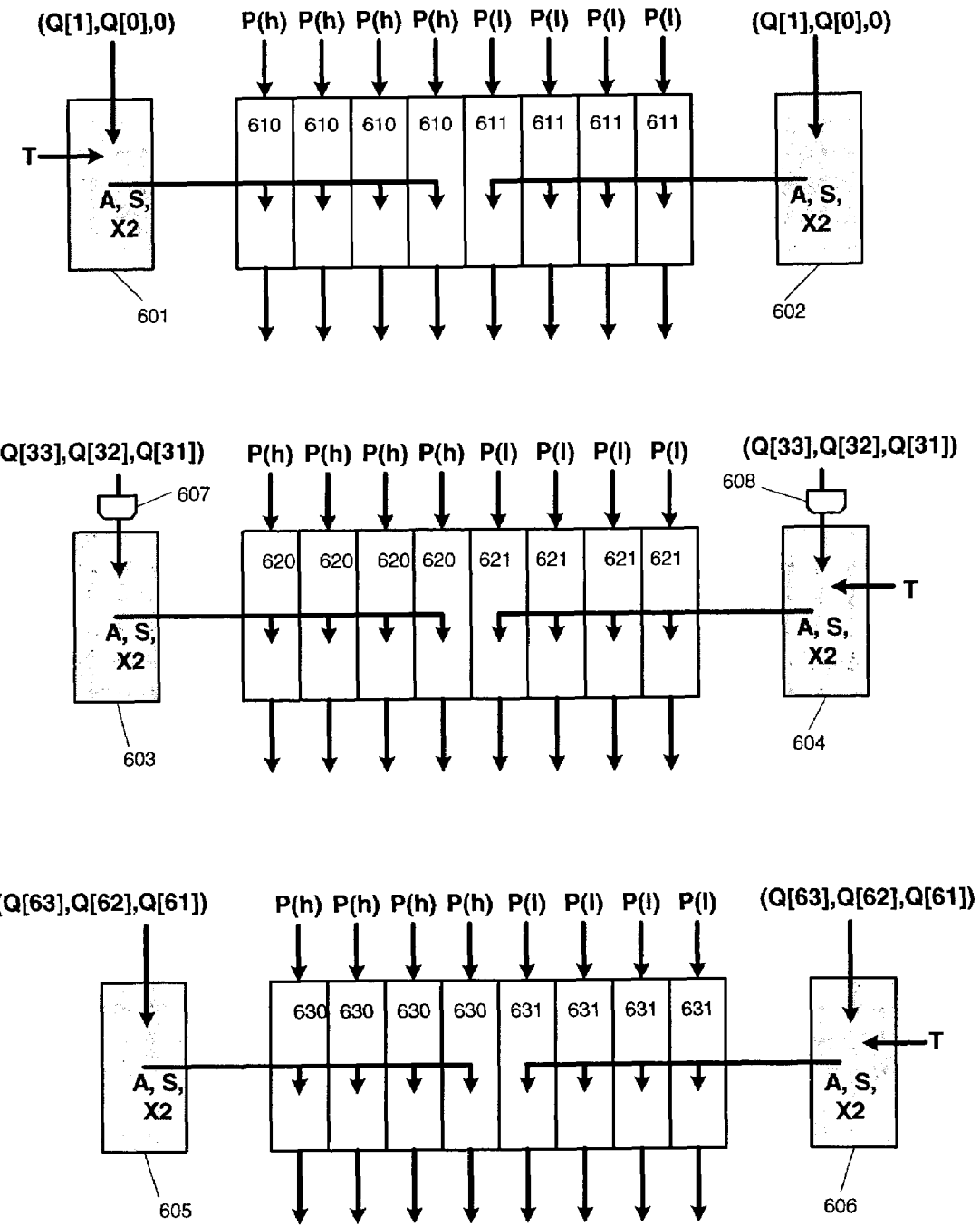
FIG. 12 is a schematic diagram of a circuit to perform partitioned parallel multiplication using the circuit of FIG. 10.

FIG. 12 is a schematic diagram of part of a circuit to produce a set of partial products in parallel partitioned mode. The inputs to be multiplied are two 64 bit numbers (although only 8 bits are illustrated for simplicity), P and Q. Q is divided into multiplier groups, and a pair of Booth encoders is used for each multiplier group input, one (a "T-Booth encoder") having a T control input to allow the partial product bits to be forced to zero in parallel partitioned mode, and the other (an "N-Booth encoder") having no T control input. In FIG. 12, only the circuitry for three of the multiplier groups is shown, for illustrative purposes.

The top part of FIG. 12 shows the circuitry for the first multiplier group of input number Q, i.e. (Q[1],Q[0],0), which is in the low part of Q when Q is partitioned. The multiplier group is input to both a T-Booth encoder 601 and an N-Booth encoder 602. A group of Booth multiplexers is shown, where half of the Booth multiplexers 610 accept input bits P(h) from the high part of input number P, and the other half of the Booth multiplexers 611 accept input bits P(1) from the low part of input number P. Although the figure shows a group of eight Booth multiplexers, this number is for illustrative purposes, and to multiply a pair of 64-bit inputs together, 64 Booth multiplexers may be provided in the group.

The T-Booth encoder 601 is connected to the P(h) multiplexers 610, and the N-Booth encoder 602 is connected to the P(1) multiplexers 611. This ensures that the T input will not force the partial product bits to zero for terms involving the low part of Q times the low part of P, but that the T input will force the partial product bits to zero for terms involving the low part of Q times the high part of P.

The multiplier groups (Q[3],Q[2],Q[1]) to (Q[31],Q[30], Q[29]), which are all in lower part of Q, are all dealt with in the same way as (Q[1],Q[0],0). The middle part of FIG. 12 shows the circuitry for the first multiplier group of the high part of Q, which is (Q[33],Q[32],Q[31]). Here, in partitioned mode, Q[31] must be forced to zero, so that the inputs are (Q[33],Q[32],0). This can be done using single AND gates 607, 608 before the N-Booth encoder and T-Booth encoder, where the inputs of the AND gates 607, 608 are Q[31] and not-T. The T-Booth encoder 604 is now connected to the Booth multiplexers 621 for P(1) and the N-Booth encoder 603 is now connected to the Booth multiplexers 620 for P(h). This ensures that the T input will not force the partial product bits to zero for terms involving the high part of Q times the high part of P, but that the T input will force the partial product bits to zero for terms involving the high part of Q times the low part of P.

The multiplier groups (Q[35],Q[34],Q[33]) to (Q[63],Q [62],Q[61]), which are all high part of Q, are all dealt with in the same way as (Q[33],Q[32],Q[31]), except that no extra AND gates are provided on the Booth encoder inputs. The lower part of FIG. 10 shows the circuitry for the last multiplier group of the high part of Q, which is (Q[63],Q [62],Q[61]). N-Booth encoder 605 is connected to the P(h) Booth multiplexers 630, and P-Booth encoder 606 is connected to the P(1) Booth multiplexers 631.

In a further embodiment of the invention, partitioned parallel multiplication may be selected with a choice of different partition sizes. This embodiment requires not a single-bit control input T, but two control inputs T1 and T2, to indicate which partition size is selected: T1 indicating 2 partitions and T2 indicating four partitions. The wiring configuration described with reference to FIG. 10 also requires modification, which may be conveniently done by providing an N-Booth encoder output to the Booth multiplexers which do not deal with cross terms in any of the available partition sizes, and providing the output of a T-Booth encoder with two control inputs to the other Booth multiplexers. For example, where the inputs are 128 bits and the allowable partition sizes are 64 and 32 bits, T-Booth encoders as described above may be used, with the T input controlled by two control inputs via an AND or an OR gate. Those Booth encoders which behave as N-Booth encoders in 64 bit mode have an AND gate on the T input, such that both control inputs must be set to one to make them behave as T-Booth encoders. Those Booth encoders which behave as T-Booth encoders in 64 bit mode and 32 bit mode have an OR gate on the T input, such that either control input may be set to one to make them behave as T-Booth encoders. In an alternative arrangement, each T-Booth encoder receives only one control input: either T1 or T2. T1 is used to control T-Booth encoders for a partition size of 64 and T2 is used to control T-Booth encoders for a partition size of 32. Thus partition into two required T1 to be high and T2 to be low.

Figure 1:
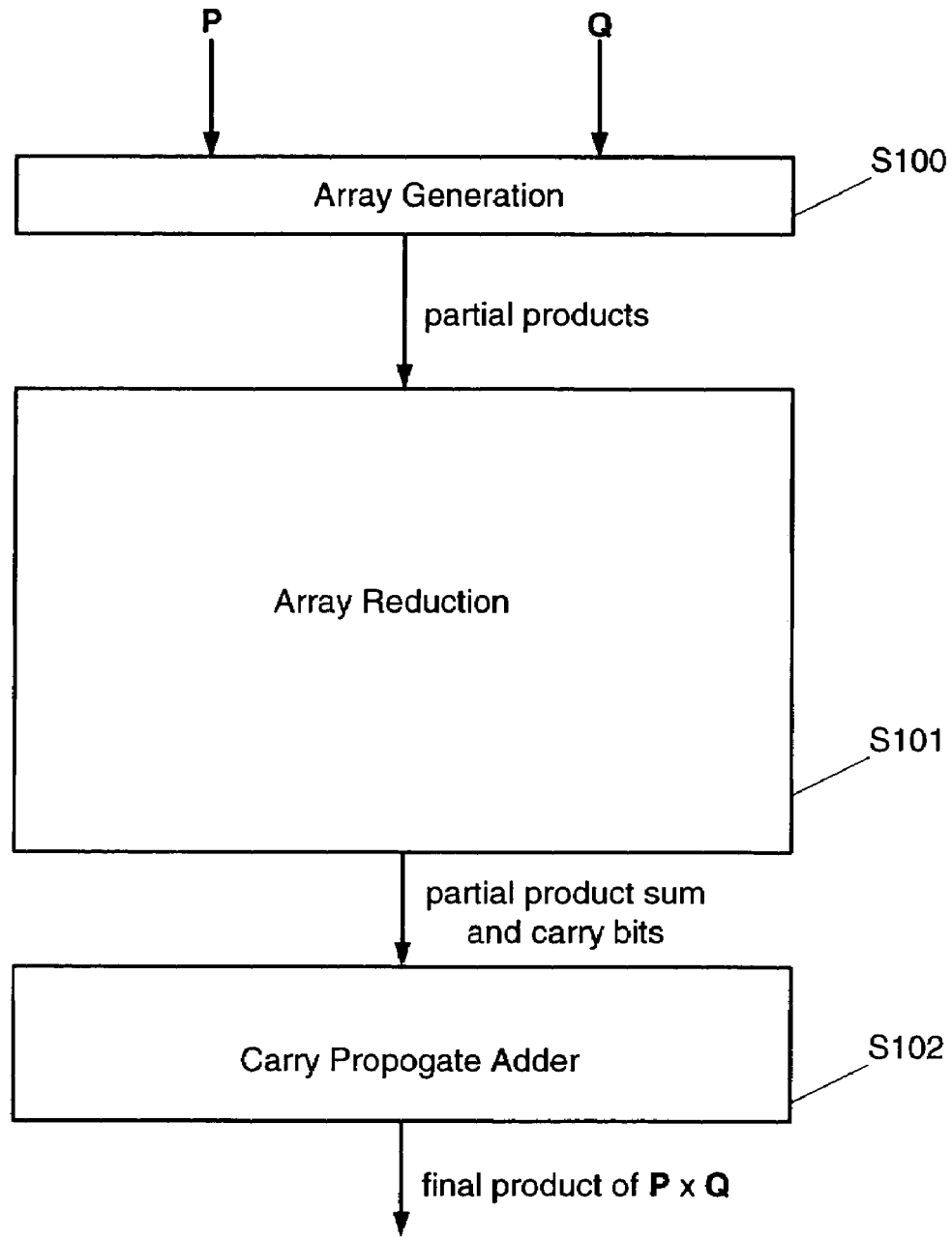
FIG. 1 is a flowchart showing a general procedure for hardware multiplication.
Figure 2:
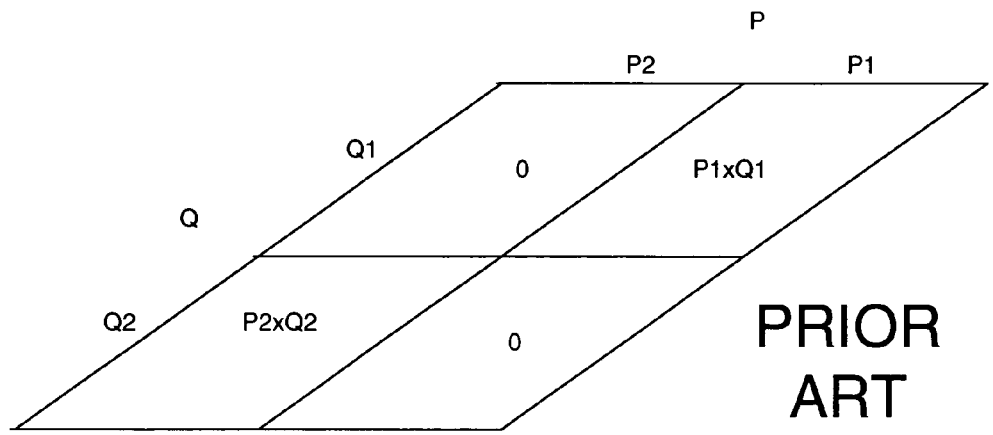
FIG. 2 is a schematic diagram of an array of partial products generated when P and Q are partitioned in two.

Partition into 4 required T1 and T2 to be high. This alternative arrangement avoids the need for additional logic in each T-Booth encoder and reduces the wiring to each T-Booth encoder. The control signals T1 and T2 can be generated centrally for all T-Booth encoders and either T1 or T2 is supplier to the corresponding T-Booth encoders to encoding a segment of the array as illustrated in FIGS. 2 and 3.

Other methods of handling multi-input Booth encoders are also possible, for example, providing some Booth encoders in which the internal logic gates have additional inputs and deal with the additional control inputs.

The logic of the present invention can be used in any digital device performing operations involving multiplication of two binary numbers, such as multiplier circuits, arithmetic logic units, microprocessors, and micro controllers. The present invention thus encompasses all such devices and integrated circuits and systems using such devices, such as image processing systems, speech and pattern recognition systems, video processing systems, game systems, simulator systems and modelling systems.

Although specific embodiments of the invention have been described, further modifications are also possible. The invention may be used in other arithmetic operations involving multiplication, such as multiply-and-accumulate, dot product, etc. Any size of input data may be used. Different formats of input data may be used, for example, unsigned integer, fractional, etc, and any combination of such formats may also be used. The data may be partitioned in different ways, e.g. 4(M/4)×4(M/4) bit multiplication or two 2(M/2)×2(M/2) multiplications or four M/4×M/4 multiplications, where M is the number of bits in the input data. The two input numbers to be multiplied (either as entire numbers or within partitions) do not need to be of the same column width i.e. the same number of bits, although they need to be partitioned in a way which will avoid overlap between the non-cross product terms when in partitioned mode.

In the description of the prior art and the embodiments of the invention hereinabove, the examples have been described with reference to Booth encoding using positive zero. However negative zero is equally applicable, in which A and S are set to 1 so that the output of the Booth multiplexer will be 1, regardless of the value of Z. A partial product output of 1111 . . . 1111 is equal to zero, because for negative numbers −N, the Booth multiplexer actually outputs −N−1 instead of −N. This is easily corrected by adding one to the complete partial product. The Booth multiplexers, 120, 220, 420 and 520 illustrated in FIGS. 4, 7, 10 and 11 are the same except that the inverters 123, 223, 423 and 523 are not required to generate the output PP.

An embodiment includes a digital circuit for generating Booth encoded output bits from a first binary input number, for use in a process including, in a selectable manner, either: multiplying together the first binary input number and a second binary input number, or multiplying together pairs of binary numbers smaller than the first or second binary input number, wherein the first and second binary input numbers are each partitioned into N parts with one binary number of each pair being a part of the first input number and the other binary number of each pair being a corresponding part of the second input number, the digital circuit comprising a Booth encoder having inputs for receiving a plurality of adjacent bits of the first binary input number, and an encoder control input for allowing selection between said multiplication of first and second binary input numbers and said multiplication of said pairs of binary numbers smaller than the first or second input number, the encoder being configured to encode said bits of the first binary input number in dependence on the encoder control input to generate Booth encoded outputs for use in selection of a partial product, the Booth encoder being for use with a selector having inputs for receiving a plurality of adjacent bits of the second binary input number, and for receiving the Booth encoded outputs from the encoder, the selector being configured to select a partial product bit according to the Booth encoded outputs and the bits of the second binary input number.

The present invention encompasses a method of designing the circuits as described above. It is well know in the art that logic circuits can be design using computer programs. The product of these methods is code representing the logic circuit which can be used for the production of the logic circuit. The code can be output from the computer on any suitable carrier medium such as a transient medium e.g. a signal including an electrical signal, an acoustic signal, a microwave signal, a magnetic signal, or an optical signal, or a storage medium e.g. a floppy disk, a hard disk, a magnetic take, a CD ROM or a solid state memory device.

While the invention has been described in terms of what are at present its preferred embodiments, it will be apparent to those skilled in the art that various changes can be made to the preferred embodiments without departing from the scope of the invention.

What is claimed is:

1. A Booth encoder circuit for generating Booth encoded output bits for a first multi bit binary input for use in a process including, in a selectable manner, either: multiplying together the first multi bit binary input and a second multi bit binary input, or multiplying together groups of bits of said first multi bit binary input and groups of bits of said second multi bit binary input where the first and second multi bit binary inputs are each partitioned into N groups, where N is an integer of two or more, the Booth encoder circuit comprising:

input connections for receiving a plurality of adjacent bits of the first multi bit binary input;

an encoder control input connection for receiving a control input for selecting between said multiplication of first and second multi bit binary inputs and said multiplication of said groups of bits of said first multi bit binary input and said groups of bits of said second multi bit binary input;

encoder logic to Booth encode said received bits of said first multi bit binary input to either generate unmodified Booth encoded output bits or modified Booth encoded output bits in dependence upon said received control input; and output connections for outputting the generated Booth encoded output bits for use by selector logic to select a partial product bit in dependence upon the generated Booth encoded output bits and adjacent bits of said second multi bit binary input.

2. A Booth encoder circuit as claimed in claim 1, wherein the encoder logic comprises an arrangement of logic gates for encoding said bits of said first multi bit binary input, and said encoder control input connection is connected as an additional input for at least one of said logic gates.

3. A Booth encoder circuit as claimed in claim 1, wherein said encoder control input is arranged to receive a single bit control input.

4. A Booth encoder circuit as claimed in claim 1, wherein said encoder logic is arranged to set a plurality of bits of said modified Booth encoded output to a state dependent upon said control input.

5. A Booth encoder circuit as claimed in claim 4, wherein said encoder logic is arranged to set two bits of said modified Booth encoded output high in response to said control input.

6. A Booth encoder circuit as claimed in claim 1, wherein said encoder logic is adapted to generate said unmodified Booth encoded output bits as a plurality of bits indicating a multiplication factor to be used in calculating the partial product, and to generated said modified generated Booth encoded output bits as a plurality of bits at least one of which is set to a state dependent upon said control input.

7. A Booth encoder circuit as claimed in claim 6, wherein said encoder logic is adapted to generate one of said unmodified Booth encoded output bits to include a sign bit to indicate the sign of said multiplication factor and to modify said sign bit in dependence upon said control input in the generation of said modified Booth encoded output bits.

8. A Booth encoder circuit as claimed in claim 6, wherein said encoder logic is adapted to generate one of said unmodified Booth encoded output bits as a zero-indicator bit which takes the same value as the sign bit to select a multiplication factor of zero and which takes the opposite value to the sign bit to select a non-zero multiplication factor, and to modify said zero-indicator bit in dependence upon said control input in the generation of said modified Booth encoded output bits.

9. A Booth encoder circuit as claimed in claim 6, wherein said encoder logic is adapted to generate a subset of said unmodified and modified Booth encoded output bits as one or more magnitude bits which indicate the magnitude of a non-zero multiplication factor.

10. A Booth encoder circuit as claimed in claim 1, wherein said input connections are arranged to receive three adjacent bits of the first multi bit binary input.

11. A Booth encoder circuit as claimed in claim 1, wherein said input connections are arranged to receive four adjacent bits of the first multi bit binary input.

12. A digital circuit for generating a partial product bit for use in a process including, in a selectable manner, either: multiplying together the first multi bit binary input and a second multi bit binary input, or multiplying together groups of bits of said first multi bit binary input and groups of bits of said second multi bit binary input where the first and second multi bit binary inputs are each partitioned into N groups, where N is an integer of two or more, the digital circuit comprising:
the Booth encoder circuit as claimed in claim 1; and
a selector having input connections for receiving adjacent bits of said second multi bit binary input and Booth input connections connected to said output connections of said Booth encoder circuit for receiving said generated Booth encoded output bits, and selector logic for selecting and outputting a partial product bit using said adjacent bits of said second multi bit binary input and said generated Booth encoded output bits.

13. A digital circuit as claimed in claim 12, wherein said selector logic comprises first selector logic having selection inputs connected to said input connections and at least one selector input connected to at least one of said Booth input connections for selecting from said adjacent bits of said second multi bit binary input on the basis of at least one said generated Booth encoded output bits, and second selector logic having selection inputs connected to a plurality of said Booth input connections and at least one selector input connected to the output of said first selector logic for selecting from said generated Booth encoded output bits on the basis of the output of said first selector logic.

14. A digital circuit as claimed in claim 13, wherein said first selector logic receives at least one generated Booth encoded output bit representing a multiplication factor to be used in the calculation of the partial product on said at least one selector input.

15. A digital circuit as claimed in claim 14, wherein said second selector logic receives two said generated Booth encoded output bits on said selection inputs, said generated Booth encoded output bits representing the sign of the multiplication factor and whether or not the partial product should be zero for unmodified generated Booth encoded output bits or two said generated Booth encoded output bits representing a state dependent upon said control input for modified generated Booth encoded output bits.

16. A digital circuit for processing a first multi bit binary input and a second multi bit binary input to generate partial product outputs in a process including, in a selectable manner, either: multiplying together the first multi bit binary input and the second multi bit binary input, or multiplying together groups of bits of said first multi bit binary input and groups of bits of said second multi bit binary input where the first and second multi bit binary inputs are each partitioned into N groups, where N is an integer of two or more, the circuit comprising:
a plurality of first digital circuits as claimed in claim 12; and
a plurality of second digital circuits, each second digital circuit comprising Booth encoder logic for receiving groups of bits of said first multi bit binary number and for generating Booth encoded output bits, and selector logic for receiving adjacent bits of said second multi bit binary input and said generated Booth encoded output bits and for selecting and outputting a partial product bit using said adjacent bits of said second multi bit binary input and said generated Booth encoded output bits;
wherein a first plurality of said first digital circuits are connected to a group of low significant bits of said first multi bit binary input, a group of high significant bits of said second multi bit binary input, and said control input, and a second plurality of said first digital circuits are connected to a group of high significant bits of said first multi bit binary input, a group of low significant bits of said second multi bit binary input, and said control input;
a first plurality of said second digital circuits are connected to a group of high significant bits of said first multi bit binary input, a group of high significant bits of said second multi bit binary input, and said control input, and a second plurality of said second digital circuits are connected to a group of low significant bits of said first multi bit binary input, a group of low significant bits of said second multi bit binary input, and said control input.

17. A digital circuit as claimed in claim 16, wherein said groups of high and low bits comprise (M–M/N) bits, where M is the number of bits of said first and second multi bit inputs and N is the number of groups into which the inputs are selectably partitioned by said control input.

18. A digital device as claimed in claim 16 for performing computation including parallel partitioned multiplication, including control input generator logic to generate said control signal to select parallel partitioned multiplication.

19. A digital device as claimed in claim 18, wherein said control input generator logic is arranged to generate said control input as a plurality of bits indicative of the number of partitions for perform parallel partitioned multiplication using a choice of partition sizes.

20. A digital circuit for generating an output based on an operation involving multiplication of binary numbers comprising
a digital circuit as claimed in claim 16 for generating an array of partial products;
array reduction logic for reducing the number of partial products in the array; and
binary addition logic for adding the reduced partial products to generate an output.

21. A multiplication logic circuit comprising the digital circuit of claim 20 for multiplying at least one pair of binary numbers, wherein the output is the multiplication of said at least one pair of binary numbers.

22. A multiply-accumulate logic circuit comprising the digital circuit of claim 20, including logic for accumulating previous multiplications.

23. An integrated circuit comprising the digital circuit as claimed in claim 20.

24. A digital circuit for generating partial product bits for use in parallel partitioned multiplication of a first input number by a second input number, the digital circuit comprising:
an encoder for receiving a plurality of adjacent bits of the first input number, a plurality of adjacent bits of the second input number, and a control input which indicates selection or non-selection of partitioned parallel multiplication, and for encoding said bits of the first input number to generate a control signal for use in selection of a partial product, said encoding including influencing the generation of said control signal when parallel partitioned multiplication is selected, such that the control signal is set to represent a partial product of zero; and
a selector for selecting a partial product bit using said bits of the second input number and said control signal.

25. A digital circuit as claimed in claim 24, wherein the encoder comprises an arrangement of logic gates for encoding said bits of the first input number to generate the control signal, and the control input comprises an additional input of at least one of said logic gates, such that the output of the logic gate is unaffected by the control input when partitioned parallel multiplication is not selected.

26. A digital circuit as claimed in claim 24, wherein said control signal comprises a plurality of control bits indicating the multiplication factor to be used in calculating the partial product.

27. A digital circuit as claimed in claim 26, wherein one of said control bits comprises a sign bit to indicate the sign of said multiplication factor.

28. A digital circuit as claimed in claim 26, wherein one of said control bits comprises a zero-indicator bit, which takes the same value as the sign bit to select a multiplication factor of zero, and which takes the opposite value to the sign bit to select a non-zero multiplication factor.

29. A digital circuit as claimed in claim 26, wherein a subset of said control bits are magnitude bits which indicate the magnitude of a non-zero multiplication factor.

30. A digital circuit as claimed in claim 24, wherein said plurality of adjacent bits of the first input number comprises three bits.

31. A digital circuit as claimed in claim 24, wherein said plurality of adjacent bits of the first input number comprises four bits.

32. A digital circuit as claimed in claim 24, wherein said encoding comprises Booth encoding.

33. A method of using a digital circuit to generate partial product bits for use in parallel partitioned multiplication of a first input number by a second input number, the method comprising:
receiving a plurality of adjacent bits of the first input number, a plurality of adjacent bits of the second input number, and a control input which indicates selection or non-selection of partitioned parallel multiplication;
encoding said bits of the first input number to generate a control signal for use in selection of a partial product, said encoding including influencing the generation of said control signal when parallel partitioned multiplication is selected, such that the control signal is set to represent a partial product of zero; and
selecting a partial product bit using said bits of the second input number and said control signal.

34. A method as claimed in claim 33, wherein the encoding comprises:
using an arrangement of logic gates for encoding said bits of the first input number to generate the control signal, and
using the control input for an additional input of at least one of said logic gates, such that the output of the logic gate is unaffected by the control input when partitioned parallel multiplication is not selected.

35. A method as claimed in claim 33, wherein said control signal comprises a plurality of control bits indicating the multiplication factor to be used in calculating the partial product.

36. A method as claimed in claim 35, wherein one of said control bits comprises a sign bit to indicate the sign of said multiplication factor.

37. A method as claimed in claim 35, wherein one of said control bits comprises a zero-indicator bit, which takes the same value as the sign bit to select a multiplication factor of zero, and which takes the opposite value to the sign bit to select a non-zero multiplication factor.

38. A method as claimed in claim 35, wherein a subset of said control bits are magnitude bits which indicate the magnitude of a non-zero multiplication factor.

39. A method as claimed in claim 33, wherein said plurality of adjacent bits of the first input number comprises three bits.

40. A method as claimed in claim 33, wherein said plurality of adjacent bits of the first input number comprises four bits.

41. A method as claimed in claim 33, wherein said encoding comprises Booth encoding.

42. A Booth encoder circuit for generating Booth encoded output bits for a first multi bit binary input for use in a process including, in a selectable manner, either: multiplying together the first multi bit binary input and a second multi bit binary input, or multiplying together groups of bits of said first multi bit binary input and groups of bits of said second multi bit binary input where the first and second multi bit binary inputs are each partitioned into N groups, where N is an integer of two or more, the Booth encoder circuit comprising:
input means for receiving a plurality of adjacent bits of the first multi bit binary input;
encoder control input means for receiving a control input for selecting between said multiplication of first and second multi bit binary inputs and said multiplication of said groups of bits of said first multi bit binary input and said groups of bits of said second multi bit binary input;

encoder means for Booth encoding said received bits of said first multi bit binary input to either generate unmodified Booth encoded output bits or modified Booth encoded output bits in dependence upon said received control input; and output means for outputting the generated Booth encoded output bits for use by selector logic to select a partial product bit in dependence upon the generated Booth encoded output bits and adjacent bits of said second multi bit binary input.

* * * * *